United States Patent
Cormier, Jr. et al.

(10) Patent No.: US 8,228,076 B2
(45) Date of Patent: Jul. 24, 2012

(54) DECONVOLUTION-BASED CAPACITIVE TOUCH DETECTION CIRCUIT AND METHOD

(75) Inventors: Ronald F. Cormier, Jr., Tucson, AZ (US); Michael D. Snedeker, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 493 days.

(21) Appl. No.: 12/587,453

(22) Filed: Oct. 7, 2009

(65) Prior Publication Data
US 2010/0244859 A1    Sep. 30, 2010

Related U.S. Application Data

(63) Continuation-in-part of application No. 12/383,696, filed on Mar. 27, 2009, now Pat. No. 8,018,238.

(51) Int. Cl.
*G01R 27/26* (2006.01)
(52) U.S. Cl. ........................................ 324/678
(58) Field of Classification Search .................. None
See application file for complete search history.

(56) References Cited

U.S. PATENT DOCUMENTS

| | | | |
|---|---|---|---|
| 4,459,541 A * | 7/1984 | Fielden et al. ................. 324/678 |
| 4,831,325 A * | 5/1989 | Watson, Jr. .................... 324/678 |
| 7,098,675 B2 | 8/2006 | Inaba et al. .................... 324/678 |
| 7,129,714 B2 | 10/2006 | Baxter ............................ 324/678 |
| 7,205,776 B2 | 4/2007 | Kinoshita et al. ............. 324/658 |
| 7,288,946 B2 | 10/2007 | Hargreaves et al. ........... 324/678 |
| 7,301,350 B2 | 11/2007 | Hargreaves et al. ........... 324/678 |
| 7,724,000 B2 * | 5/2010 | Grosjean et al. .............. 324/661 |
| 7,804,307 B1 * | 9/2010 | Bokma et al. ................. 324/663 |
| 7,982,471 B2 * | 7/2011 | Mueck et al. .................. 324/686 |
| 8,018,238 B2 * | 9/2011 | Cormier, Jr. ................... 324/678 |
| 8,093,914 B2 * | 1/2012 | Maharyta et al. ............. 324/684 |
| 2009/0153152 A1 * | 6/2009 | Maharyta et al. ............. 324/684 |
| 2010/0066391 A1 * | 3/2010 | Hirasaka et al. .............. 324/686 |
| 2010/0231241 A1 * | 9/2010 | Mueck et al. .................. 324/686 |
| 2011/0012618 A1 * | 1/2011 | Teterwak et al. .............. 324/607 |
| 2011/0279170 A1 * | 11/2011 | Cormier, Jr. ................... 327/517 |

* cited by examiner

*Primary Examiner* — Jermele M Hollington
(74) *Attorney, Agent, or Firm* — John J. Patti; Wade J. Brady, III; Frederick J. Telecky, Jr.

(57) ABSTRACT

A capacitance measuring system includes analog-digital circuitry (15) coupled to row conductors (2i) and column conductors (3i) of a touch screen panel (13A) for producing a first digital signal (DATA) representative of cross-coupling capacitances ($C_{SENij}$). Row drive circuitry (45) superimposes charge transfers from cross-coupling capacitances of the row conductors to a first column conductor to cause the first digital signal to be a convoluted signal. Calibration circuitry (39,40) subtracts base line data from the first digital signal to produce a second digital signal ($\Delta$DATA) representing touch-induced capacitance change values ($\Delta C_{SENij}$). A deconvolution circuit (44) deconvolutes the second digital signal to produce a digital output (58) representing a magnitude map of the touch-induced capacitance change values.

20 Claims, 14 Drawing Sheets

DECONVOLUTION-BASED CAPACITIVE TOUCH DETECTION CIRCUIT AND METHOD

CROSS REFERENCE TO RELATED APPLICATION

This application is a continuation-in-part of commonly assigned patent application Ser. No. 12/383,696 filed on Mar. 27, 2009 now U.S. Pat. No. 8,018,238, entitled "EMBEDDED SAR BASED ACTIVE GAIN CAPACITANCE MEASUREMENT SYSTEM AND METHOD" by Ronald F. Cormier, Jr., and incorporated herein by reference.

BACKGROUND OF THE INVENTION

The present invention relates generally to circuits and techniques for measurement of capacitance, and more particularly to improvements in circuits and techniques adapted for processing digital signals generated by the touch screen controller circuitry that scans a touch screen panel.

Touch screen controller circuits for use in touch screen applications have generally included digital controller circuitry and analog circuitry for detecting/measuring the presence of capacitance if a user touches a point on a touch screen. The presence or movement of a user's finger in the vicinity of the electric field associated with the cross-coupling capacitance in the touch screen disturbs or impedes the electric field and therefore modifies the cross-coupling capacitance. The capacitance detecting/measuring circuit therefore indicates the presence of the finger as a change in the modified touch-screen cross-coupling capacitance. The prior art typically utilizes current sourcing/sinking circuitry, RC networks, and counters to provide a digital indication of the measured capacitance, which, in a touch screen controller, can be used to precisely identify/indicate the screen location being touched.

FIG. 1A illustrates part of a touch screen panel 1-1 which includes a suitable number of horizontal transparent conductors 2 disposed on one surface of a thin, transparent insulative layer (not shown). A suitable number of vertical transparent conductors 3 are disposed on the other surface of the insulative layer. The left end of each of the horizontal conductors 2 can be connected to suitable current sourcing or drive circuitry. The bottom end of each of the vertical conductors 3 can be connected to suitable current sinking or receiving circuitry. A cross-coupling capacitance $C_{SENij}$ occurs at an "intersection" of each horizontal conductor such as $2i$ and each vertical conductor such as $3j$, the intersection being located directly beneath a "touch point" 13. Note that the touching by a user's finger does not necessarily have to occur directly over a touch point. If multiple touch points 13 are sufficiently close together, then a single touching may disrupt the electric fields of a number of different cross-coupling capacitances $C_{SENij}$. However, the largest change in the value of a particular cross-coupling capacitance $C_{SENij}$ occurs when the touching occurred directly over that particular cross-coupling capacitance.

FIG. 1B illustrates any particular horizontal conductor $2i$ and any particular vertical (as in FIG. 1A) conductor $3j$ and the associated cross-coupling capacitance $C_{SENij}$ between them, i and j being row and column index numbers of the horizontal conductors 2 and the vertical conductors 3, respectively. (By way of definition, the structure including the overlapping conductors $2i$ and $3j$ which result in the cross-coupling capacitance $C_{SENij}$ is referred to as "capacitor $C_{SENij}$". Thus, the term "$C_{SENij}$" is used to refer both to the capacitor and its capacitance.)

The drive circuitry for horizontal conductor $2i$ can include a drive buffer 12 which receives appropriate pulse signals on its input 4. The output of drive buffer 12 is connected to the right end of conductor $2i$, which is modeled as a series of distributed resistances RA and distributed capacitances CA each connected between ground and a node between two adjacent distributed resistances RA. The receive circuitry for conductor $3j$ is illustrated as being connected to the right end of vertical conductor $3j$. A switch $S1j$ is connected between conductor $3j$ and $V_{SS}$. A sampling capacitor $C_{SAMPLE}$ has one terminal connected to conductor $3j$ and another terminal connected by conductor 5 to an input of a comparator 6, one terminal of a switch $S2j$, and one terminal of a resistor $R_{SLOPE}$. The other terminal of switch $S2j$ is connected to $V_{SS}$. The other terminal of resistor $R_{SLOPE}$ is connected to the output of a slope drive amplifier 9, the input of which receives a signal SLOPE DRIVE. The other input of comparator 6 is connected to $V_{SS}$. The output of comparator 6 is connected to an input of a "timer capture register" 7, which can be a counter that, together with resistor $R_{SLOPE}$ and capacitor $C_{SAMPLE}$, perform the function of generating a digital output signal on bus 14 representing the value of $C_{SENij}$.

A typical prior art touch screen controller circuit uses a methodology of driving a row of a touch screen with a square wave signal, amplifies and filters a resulting column signal, and then digitizes that column signal by means of a delta-sigma ADC or a low resolution pipeline ADC. The digitized column signal is provided as an input to a microprocessor, which executes a program to determine the location of the touched cross-coupling capacitance of the panel. Presently available touch panel products are believed to contain a microprocessor, such as an ARM microprocessor, for processing search digital column signals using complicated algorithms in order to accomplish the detection of the location of a finger touch on the panel.

A problem of the above described prior art is that the time required for the capacitance measurement is time-varying in the sense that a lower value of the capacitance $C_{SENij}$ requires less counting time by timer capture register 7, whereas a higher value of the capacitance $C_{SENij}$ requires more counting time by timer capture register 7. The widely variable capacitance measurement times may be inconvenient for a user. Also, the system is quite susceptible to noise because comparator 6 in Prior Art FIG. 1B is connected via $C_{SAMPLE}$ during the entire capacitance measurement process.

Another problem of the above described prior art is that it is unsuitable for applications in which a small, inexpensive, low power touch screen controller circuit is needed because of the complexity of the above described prior art.

Thus, there is an unmet need for a capacitance measurement system that is capable of making accurate measurements of a broader range of capacitances than the prior art.

There also is an unmet need for an improved digital circuit and method for making touch screen capacitance measurements in a touchscreen controller circuit.

There also is an unmet need for a digital capacitance measurement system and method having greater capacitance measurement sensitivity than the prior art.

There also is an unmet need for a digital capacitance measurement system and method having greater capacitance per LSB measurement sensitivity than the prior art.

There also is an unmet need for a digital capacitance measurement system and method having a programmable ability to actively compensate for large parasitic capacitances.

There also is an unmet need for a digital capacitance measurement system and method that is more suitable than the prior art for applications in which a small, inexpensive, low power touch screen controller circuit is needed because of the complexity and size of the prior art.

There also is an unmet need for a digital capacitance measurement system and method that allows simultaneous driving of multiple rows of a touch screen panel without overdriving or saturating an amplifier which receives column signals generated as a result of the simultaneous driving of multiple rows.

SUMMARY OF THE INVENTION

It is an object of the invention to provide a capacitance measurement system that is capable of making accurate measurements of a broader range of capacitances than the prior art.

It is another object of the invention to provide an improved digital circuit and method for making touch screen capacitance measurements in a touchscreen controller circuit.

It is another object of the invention to provide a digital capacitance measurement system to and method having greater capacitance measurement sensitivity than the prior art.

It is another object of the invention to provide a digital capacitance measurement system and method having greater capacitance per LSB measurement sensitivity than the prior art.

It is another object of the invention to provide a digital capacitance measurement system and method having the ability to compensate for large parasitic capacitances.

It is another object of the invention to provide a digital capacitance measurement system and method that is more suitable than the prior art for applications in which a small, inexpensive, low power touch screen controller circuit is needed because of the complexity and size of the prior art.

It is another object of the invention to provide a highly programmable capacitance measurement system capable of compensating manufacturing variations of particular panel families or different panel products It is another object of the invention to provide a high programmable capacitance measurement system capable of compensating manufacturing variations of integrated circuit variations within wafer lots and/or individual IC devices within a single wafer.

It is another object of the invention to provide a digital capacitance measurement system and method that allows simultaneous driving of multiple rows of a touch screen panel without overdriving or saturating an amplifier which a column signal generated as a result of the simultaneous driving of multiple rows.

It is another object of the invention to provide a digital capacitance measurement system and method that facilitates simultaneous driving of multiple rows of a touch screen panel without overdriving or saturating an amplifier which receives a column signal generated as a result of the simultaneous driving of multiple rows by convoluting/superpositioning charge transfer from the multiple rows into the column signal and subsequently deconvoluting the digitized representation of the column signal.

It is another object of the invention to provide a digital capacitance measurement system and method that substantially reduces the digital processing requirement relative to the processing requirements of the prior art touch screen panel products by approximately an order of magnitude, and thereby provide a much smaller, faster, more economical touch screen controller than the prior art.

Briefly described, and in accordance with one embodiment, the present invention provides a capacitance measuring system that includes analog-digital circuitry (15) coupled to row conductors (2$i$) and column conductors (3$i$) of a touch screen panel (13A) for producing a first digital signal (DATA) representative of cross-coupling capacitances ($C_{SENij}$). Row drive circuitry (45) superimposes charge transfers from cross-coupling capacitances of the row conductors to a first column conductor to cause the first digital signal to be a convoluted signal. Calibration circuitry (39,40) subtracts base line data from the first digital signal to produce a second digital signal (ΔDATA) representing touch-induced capacitance change values ($\Delta C_{SENIJ}$). A deconvolution circuit (44) deconvolutes the second digital signal to produce a digital output (58) representing a magnitude map of the touch-induced capacitance change values.

In one embodiment, the invention provides a capacitance measuring system including analog-digital circuitry (15) coupled to row conductors (2$i$) and column conductors (3$i$) of a touch screen panel (13A) for producing a first digital signal (DATA) representative of cross-coupling capacitances ($C_{SENij}$) of the touch screen panel (13A), the analog-digital circuitry (15) including row drive circuitry (45) which superimposes charge transfers from cross-coupling capacitances ($C_{SENij}$) of at least a plurality of the row conductors (2$i$) to a first column conductor (3$i$) to cause the first digital signal (DATA) to be a convoluted signal which is a function of the cross-coupling capacitances ($C_{SENij}$) of at least the plurality of row conductors (2$i$). Calibration circuitry (39,40) is coupled to receive the first digital signal (DATA) for subtracting base line data representing neutral values of the cross-coupling capacitances ($C_{SENij}$) and subtracting the base line data from the first digital signal (DATA) to produce a second digital signal (ΔDATA) which represents digital touch-induced capacitance change values ($\Delta C_{SENIJ}$) caused by the presence of a touch near a cross-coupling capacitance ($C_{SENij}$) of the touch screen panel (13A). A deconvolution circuit (44) deconvolutes the second digital signal (ΔDATA) to produce a third digital signal (58) which represents a magnitude map of the touch-induced capacitance change values ($\Delta C_{SENIJ}$).

In a described embodiment, the row drive circuitry (45) includes circuitry for precharging and sampling a cross-coupling capacitance of interest ($C_{RO}$) so as to transfer a first amount of charge (3$q$) to the first column conductor (3$j$), precharging and sampling each of a first group of approximately half of the cross-coupling capacitances other than the cross-coupling capacitance of interest ($C_{RO}$) so as to transfer a second amount of charge (+q) from each cross-coupling capacitance of the first group to the first column conductor (3$j$), and precharging and sampling each of a second group of approximately another half of the cross-coupling capacitances other than the cross-coupling capacitance of interest ($C_{RO}$) so as to transfer a third amount of charge (−q) from each cross-coupling capacitance of the second group to the first column conductor (3$j$) to superimpose a convoluted signal on the first column conductor (3$j$). The precharging and sampling occurs prior to converting of a resulting convoluted signal on the first column conductor (3$j$) to the first digital signal (DATA). The second amount of charge (+q) and the third amount (−q) of charge are of opposite polarities so as to result in canceling of a net amount of charge transferred from the first and second groups to the first column conductor (3$j$), and wherein the first amount of charge (+3q) has a magnitude substantially greater than a magnitude of the second amount of charge and a magnitude of the third amount of charge.

In a described embodiment, the deconvolution circuit (44) operates on the second digital signal (ΔDATA) by in essence solving a plurality of equations that represent the cross-coupling capacitances ($C_{R0,1\ldots9}$) as functions of the amounts and polarities of charge transferred to the first column conductor (3j) and corresponding voltage components ($V_{R0,1\ldots9}$) produced on the first column conductor in order to produce the third digital signal (58). The deconvolution circuit (44) stores an inverse matrix ($J^{-1}$) representing coefficients of the plurality of equations that represent the cross-coupling capacitances ($C_{R0,1\ldots9}$) as functions of the amounts and polarities of charge transferred to the first column conductor (3j) and the corresponding voltage components ($V_{R0,1\ldots9}$) produced on the first column conductor, and multiplies the inverse matrix ($J^{-1}$) by a vector matrix representing values of the second digital data signal (ΔDATA) obtained for each of the cross-coupling capacitances ($C_{R0,1\ldots9}$) to obtain the values of the third digital signal (58) representing the magnitude map of the touch capacitance change values ($\Delta C_{SENIJ}$).

In a described embodiment, a touch detection circuit (50) coupled to receive the third digital signal (58) repeatedly detects and stores updated values of a first maximum magnitude capacitance variable (Max 1) and associated row and column locations and values to determine the location of a maximum magnitude cross-coupling capacitance change ($\Delta C_{SENIJ}$) caused by a present first touch on the touch screen panel (13A). The touch detection circuit (50) also detects and stores updated values of a second maximum magnitude capacitance variable (Max 2) and associated row and column locations to determine the location of a maximum magnitude cross-coupling capacitance change ($\Delta C_{SENIJ}$) caused by a present second touch on the touch screen panel (13A) located at least a minimum distance from the first touch.

In a described embodiment, the row drive circuitry (45) superimposes the charge transfers to the first column conductor (3j) essentially simultaneously.

In a described embodiment, the row drive circuitry (45) superimposes charge transfers from cross-coupling capacitances ($C_{SENij}$) of at least the plurality of the row conductors (2i) to a second column conductor to cause a corresponding portion of the first digital signal (DATA) to be a convoluted signal which is a function of the cross-coupling capacitances ($C_{SENij}$) of at least the plurality of row conductors (2i).

In a described embodiment, the calibration circuitry (39, 40) includes a calibration memory (39) for storing the base line data and a digital summer (40) for subtracting the base line data from the first digital signal (DATA). In a described embodiment, the deconvolution circuit (44) includes a memory (43 in FIG. 3D) for storing values of the second digital data signal (ΔDATA) obtained for each of the cross-coupling capacitances ($C_{R0,1\ldots9}$) coupled to the first column conductor (3j) and wherein the touch detection circuit (50) includes a memory (50B) for storing updated values of the first maximum magnitude capacitance variable (Max 1) and associated row and column locations.

A described embodiment, the analog-digital circuitry (15) a successive approximation register analog-to-digital conversion circuit (SAR ADC) (17) including a comparator (26), a divider/feedback CDAC (capacitor digital-to-converter) (23) including a plurality of weighted CDAC capacitors (25-0, ... 25-k, ... 25-n) each having a first terminal coupled to a corresponding one of a plurality of conductors (21-0, ... 21-k, ... 21-n), respectively, and each having a second terminal coupled by a first conductor (24) to a first input (+) of the comparator (26), SAR logic and switch circuitry (28,30) which produces a digital output (DATA) on a digital bus (32), an output of the comparator (26) being coupled to an input of the SAR logic and switch circuitry (28,30), the SAR logic and switch circuitry (28,30) being coupled to control the plurality of conductors (21-0, ... 21-k, ... 21) during a SAR conversion, and a first switch (S6) having a first terminal coupled the first input (+) of the comparator (26). An active network (29) couples a capacitor ($C_{SENj}$ in FIG. 2A (or $C_{SEN}$ in FIG. 2G)) to be measured to the SAR ADC (17), the active network (29) including measurement conductor (20) coupled to a first terminal (3-j) of the capacitor ($C_{SENj}$) to be measured, an amplifier (31) for performing the function of aiding charge redistribution among the capacitance ($C_{SENj}$) to be measured and the CDAC capacitors (25-0 ... 25-k ... 25-n) during a measurement phase, the amplifier (31) having a first input (−) coupled to a second terminal of the first switch (S6), a second input (+) coupled to a first reference voltage ($V_{AZ}$) and an output (20A) coupled to an amplifier output conductor (20A), and first switching circuit (S0, ... Sk ... Sn) for coupling the amplifier output conductor (20A) to the plurality of conductors (21-0, ... 21-k, ... 21-n) during the measurement phase.

In one embodiment, the invention provides a method for measuring a capacitance, including operating row drive circuitry (45) of analog-digital circuitry (15) coupled to row conductors (2i) and column conductors (3i) of a touch screen panel (13A) for producing a first digital signal (DATA) representative of cross-coupling capacitances ($C_{SENij}$) of the touch screen panel (13A) so as to superimpose charge transfers from cross-coupling capacitances ($C_{SENij}$) of at least a plurality of the row conductors (2i) to a first column conductor (3i) thereby causing the first digital signal (DATA) to be a convoluted signal which is a function of the cross-coupling capacitances ($C_{SENij}$) of at least the plurality of row conductors (2i); producing a second digital signal (ΔDATA) which represents digital touch-induced capacitance change values ($\Delta C_{SENij}$) caused by the presence of a touch near a cross-coupling capacitance ($C_{SENij}$) of the touch screen panel (13A) by subtracting base line data representing the cross-coupling capacitances ($C_{SENij}$) from the first digital signal (DATA); and deconvoluting the second digital signal (ΔDATA) to produce a third digital signal (58) which represents a magnitude map of the touch-induced capacitance change values ($\Delta C_{SENIJ}$).

In a described embodiment, the method includes precharging and sampling a cross-coupling capacitance of interest ($C_{R0}$) so as to transfer a first amount of charge (3q) to the first column conductor (3j), precharging and sampling each of a first group of approximately half of the cross-coupling capacitances other than the cross-coupling capacitance of interest ($C_{R0}$) so as to transfer a second amount of charge (+q) from each cross-coupling capacitance of the first group to the first column conductor (3j), and precharging and sampling each of a second group of approximately another half of the cross-coupling capacitances other than the cross-coupling capacitance of interest ($C_{R0}$) so as to transfer a third amount of charge (−q) from each cross-coupling capacitance of the second group to the first column conductor (3j) to thereby superimpose a convoluted signal on the first column conductor (3j). The precharging and sampling occurs prior to converting of a resulting convoluted signal on the first column conductor (3j) to the first digital signal (DATA), and wherein the second amount of charge (+q) and the third amount (−q) of charge are of opposite polarities so as to result in canceling of a net amount of charge transferred from the first and second groups to the first column conductor (3j), and wherein the first amount of charge (+3q) has a magnitude substantially greater than a magnitude of the second amount of charge and substantially greater than a magnitude of the third amount of charge.

In a described embodiment, the deconvoluting operates on the second digital signal (ΔDATA) by in essence solving a plurality of equations that represent the cross-coupling capacitances ($C_{R0,1\ldots9}$) as functions of the amounts and polarities of charge transferred to the first column conductor (3j) and corresponding voltage components ($V_{R0,1\ldots9}$) produced on the first column conductor in order to produce the third digital signal (58).

In a described embodiment, the method includes repeatedly detecting and storing updated values of a first maximum magnitude capacitance variable (Max 1) and associated row and column locations to determine the location of a maximum magnitude cross-coupling capacitance change ($\Delta C_{SENIJ}$) caused by a present first touch on the touch screen panel (13A).

In one embodiment, the invention provides a system for measuring a capacitance, including means (45) coupled to row conductors (2i) and column conductors (3i) of a touch screen panel (13A) for producing a first digital signal (DATA) representative of cross-coupling capacitances ($C_{SENij}$) of the touch screen panel (13A) so as to superimpose charge transfers from cross-coupling capacitances ($C_{SENij}$) of at least a plurality of the row conductors (2i) to a first column conductor (3i) thereby causing the first digital signal (DATA) to be a convoluted signal which is a function of the cross-coupling capacitances ($C_{SENij}$) of at least the plurality of row conductors (2i); means (36) for producing a second digital signal (ΔDATA) which represents digital touch-induced capacitance change values ($\Delta C_{SENIJ}$) caused by the presence of a touch near a cross-coupling capacitance ($C_{SENij}$) of the touch screen panel (13A) by subtracting base line data representing the cross-coupling capacitance changes ($\Delta C_{SENij}$) from the first digital signal (DATA); and means (44) for deconvoluting the second digital signal (ΔDATA) to produce a third digital signal (58) which represents a magnitude map of the touch-induced capacitance change values ($\Delta C_{SENIJ}$).

DETAILED DESCRIPTION OF THE PREFERRED EMBODIMENTS

Figure 1A:
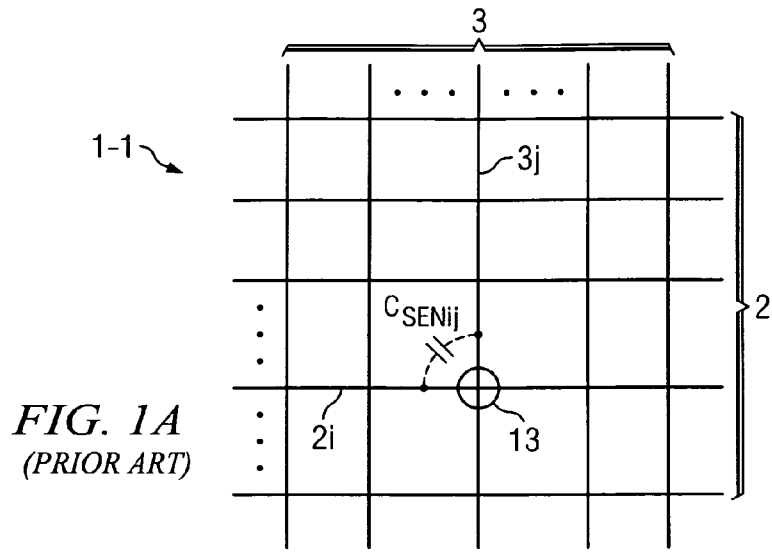
FIG. 1A illustrates a plan view diagram of upper and lower orthogonal transparent, conductive strips of a touch screen panel.
Figure 1B:
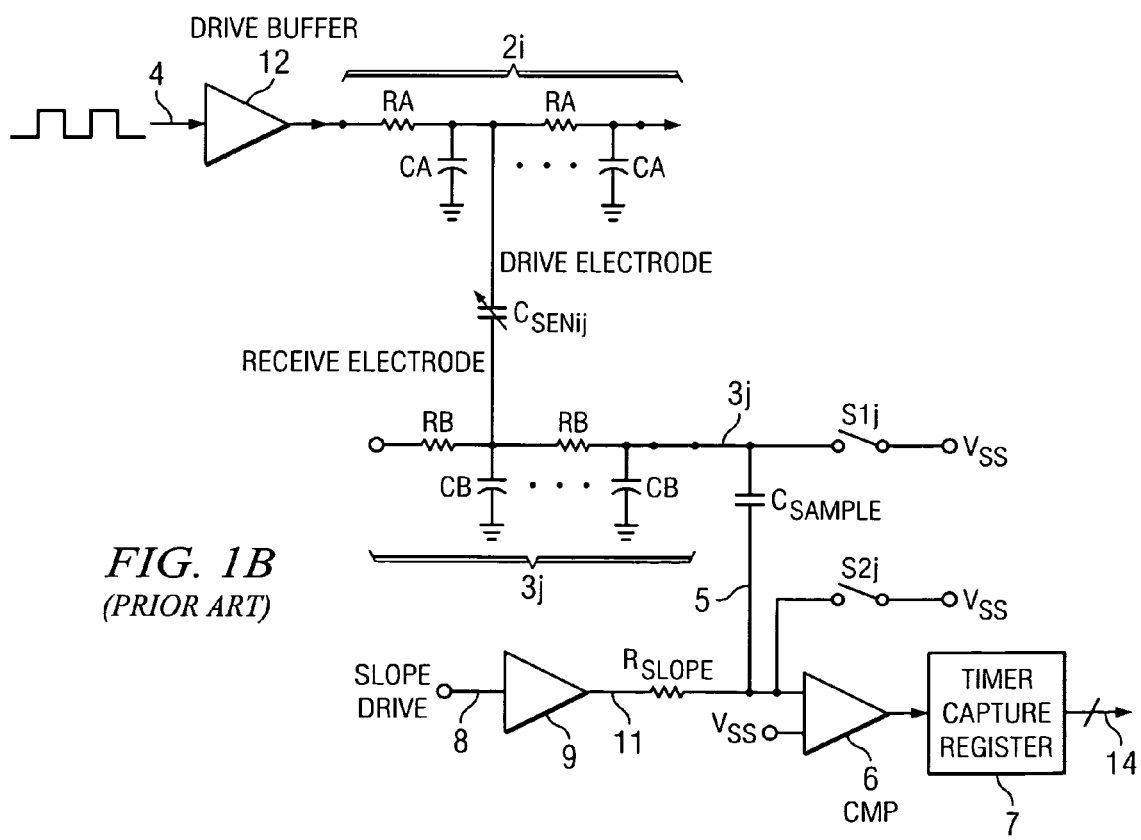
FIG. 1B is a schematic diagram representing circuitry associated with an "intersection" of a horizontal conductive, transparent strip and a vertical conductive, transparent strip of a touch screen panel, cross coupling capacitance, and circuitry for sensing the presence of a person's finger close to the intersection.
Figure 2A:
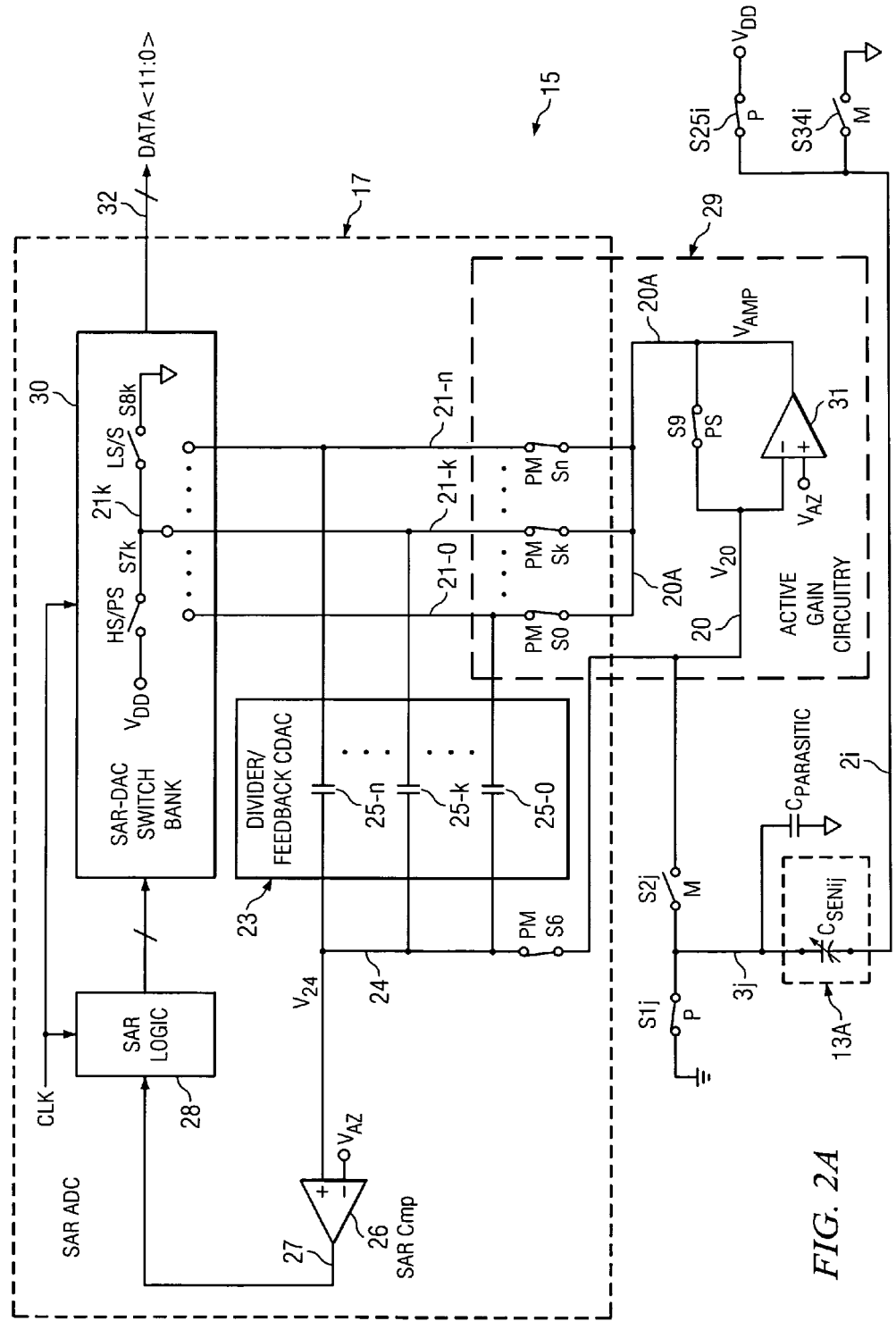
FIG. 2A is a block diagram illustrating an architecture of an embedded SAR based active gain capacitance measurement system with its switches configured for a particular precharge strategy during a precharge phase.

FIG. 2A shows a single-ended (i.e., not differential) embodiment of an embedded SAR based active capacitance measurement system 15 of the present invention which provides high capacitance measurement sensitivity, a wide range of parasitic capacitance, and a wide range of capacitance to be measured. Capacitance measurement system 15 includes active gain circuitry 29 and a SAR (successive approximation register) type of ADC (analog-to-digital converter) 17. Active gain circuitry 29 is coupled to effectuate measurement of touch screen capacitance $C_{SENij}$ where $C_{SENij}$ can be the cross-coupling capacitance in external touchscreen panel 13A (which can be similar to the touch screen panel shown in Prior Art FIGS. 1A and 1B). The capacitance $C_{SENij}$ is typically decreased (depending on the particular panel or touch button configuration) by the presence of a human finger (or other conductive probe) in the electric field associated with capacitance $C_{SENij}$.

In FIG. 2A, a cross-coupling capacitance $C_{SENij}$ at an intersection between a conductor 3j and a conductor 2i of external touch screen panel 13A is illustrated, with conductor 2i of cross-coupling capacitance $C_{SENij}$ being coupled by a switch S25i to $V_{DD}$ during the subsequently described precharge phase (waveform P in FIG. 2B) and coupled by switch S34i to ground during the subsequently described measurement phase (M in FIG. 2B). The top terminal of capacitance $C_{SENij}$ can be coupled by conductor 3j and a switch S2j to measurement conductor 20. The value of $C_{SENij}$ is affected by the touch or proximity or movement of a user's finger, depending on how close the finger approaches the intersection of conductors 2i and 3j (as in previously described Prior Art FIGS. 1A and 1B) of touchscreen panel 13A. Various parasitic capacitances having a total value $C_{PARASITIC}$ are in effect coupled between conductor $3j$ and ground, generally as shown in FIG. 2A. These parasitics may or may not be affected by the finger touch, depending on the panel configuration, but they must be accounted for in the detection of the touch.

In FIG. 2A, active gain circuitry 29 includes an operational transconductance amplifier 31 having its (−) input connected to measurement conductor 20. The (+) input of amplifier 31 is connected to an auto-zeroing voltage $V_{AZ}$. A typical value of $V_{AZ}$ would be $V_{DD}/2$. However, $V_{AZ}$ also could be ground or $V_{DD}$ (or any other suitable voltage), depending on how SAR comparator 26 is configured. Amplifier 31 produces an output voltage $V_{AMP}$ on conductor 20A. $V_{AMP}$ conductor 20A is connected to one terminal of a unity gain switch S9, the other terminal of which is connected to measurement conductor 20. Active gain circuitry 29 also includes interface switches S0 . . . Sk . . . Sn, each having a first terminal connected by $V_{AMP}$ conductor 20A. The second terminals of switches S0 . . . Sk . . . Sn are connected to "bottom plate" conductors 21-0 . . . 21-k . . . 21-n, respectively, of a divider/feedback CDAC 23 of SAR ADC 17. Active gain circuitry 29 and SAR ADC circuit 17 are connected/disconnected from each other by interface switches S0, . . . Sk, . . . Sn in response to clock signal PM.

Divider/feedback CDAC (capacitor digital-to-analog converter) 23 in SAR ADC 17 includes a "top plate" conductor 24 connected to one terminal of a switch S6, the other terminal of which is connected to measurement conductor 20. Top plate conductor 24 is also connected to a first terminal of each of binarily weighted CDAC capacitors 25-0 . . . 25-k . . . 25-n. The second terminal of each of CDAC capacitors 25-0 . . . 25-k . . . 25 is connected to a corresponding one of bottom plate conductors 21-0, 1 . . . k . . . n, respectively, of divider/feedback CDAC 23. Divider/feedback CDAC 23 may function in the precharge operation of active gain circuitry 29, always functions in charge redistribution operations of active gain circuitry 29, and always functions in the SAR analog-to-digital conversion of the voltage on $V_{AMP}$ conductor 20A into the digital output signal DATA<11:0>.

Redistribution of the charge on $C_{SENij}$ is performed by means of active circuitry 29. Divider/feedback CDAC 23 may be used by active circuitry 29 during both the precharge operation and the measurement operation or only during the measurement operation.

A typical value of $\Delta C_{SENij}$, which is the change typically produced in the capacitance of capacitor $C_{SENij}$ by the presence of a user's finger touching the capacitor, may be approximately 100 femtofarads. An amount of charge corresponding to $\Delta C_{SENij}$ is transferred to the capacitors of CDAC 23 during the measurement phase. There is a gain/attenuation implicit in the transfer, equal to $(C_{SENij}+C_{PARASITIC})$ divided by the total CDAC capacitance $C_{CDAC}$. The value of the total CDAC capacitance $C_{CDAC}$ may be approximately 13 pF, and the value of $C_{SENij}$ may be approximately 3 or 4 pF.

SAR ADC 17 includes a SAR comparator 26 having a (+) input connected to top plate conductor 24 and a (−) input connected to receive auto-zeroing voltage $V_{AZ}$. (Note that ordinarily the input applied to the (−) input of SAR comparator 26 is the analog output of another CDAC which is either being used as a mirror circuit or is being used to sample ground via a "dummy" circuit. For example, the (−) input of SAR comparator 26 could be connected to the CDAC output of the capacitance measuring system. Auto-zeroing circuitry for a SAR (successive approximation register) comparator is conventional, and can be readily implemented by those skilled in the art.) Top plate conductor 24 of divider/feedback CDAC 23, rather than the bottom plate conductors 21-0 . . . 21-k . . . 21-n thereof, preferably is connected to the (+) input of SAR comparator 26 because top plate conductor 24 typically has less parasitic capacitance. The output of SAR comparator 26 is connected by conductor 27 to the input of conventional SAR logic circuitry 28, the output bus of which is connected to the input of a conventional SAR DAC (digital-to-analog converter) switch bank circuit 30. SAR logic circuit 28 and SAR DAC switch bank 30 are clocked by a clock signal CLK.

SAR-DAC switch bank 30 includes the bank of switches $S7k$ and $S8k$ that pulls the bottom plate conductor of any particular CDAC capacitor to either a high level or a low level. Completion of a SAR analog-to-digital conversion results in the final value of DATA<11:0>. SAR logic 28 performs the function of controlling the switches in SAR DAC switch bank 30. Each of bottom plate conductors 21-0 . . . 21-k . . . 21-n is connected to a conductor $21k$ of a corresponding switching circuit, respectively, in SAR ADC switch bank 30. Each such switching circuit includes a pair of switches $S7k$ and $S8k$, where k is an index having a value between 0 and n. A first terminal of each of switches $S7k$ and $S8k$ of a "k"th pair has a first terminal connected to conductor $21k$. The second terminal of each switch $S7k$ is connected to a suitable first reference voltage (such as supply voltage $V_{DD}$), and the second terminal of each switch $S8k$ is connected to a corresponding suitable second reference voltage (such as ground or $V_{SS}$). The digital output of SAR DAC switch bank 30 is connected to data output bus 32, on which the digital data value DATA<11:0> (for a 12-bit SAR DAC) is produced. DATA<11:0)> represents the measured capacitance of $C_{SENij}$.

The HS/PS and LS/S signals in SAR DAC switch bank 30 operate the various switches $S7k$ and $S8k$, respectively, during the SAR operation. The HS signal (high SAR switch bank signal) has the same timing as the PS signal and the LS signal (low SAR switch bank signal) has the same timing as the S signal in FIG. 2B, and values of HS and LS during the conversion phase are determined by the SAR ADC algorithm being executed. (For some precharge strategies, the HS/PS and LS/S signals also operate to precharge the various bottom plate conductors 21-0 . . . 21-k . . . 21-n to either high or low voltages, respectively, according to the precharge strategy objective.)

FIG. 2A shows amplifier 31 in its unity gain configuration, i.e., with switch S9 closed, with CDAC 23 coupled between the amplifier output $V_{AMP}$ on conductor 20A and the (−) input of amplifier 31. Appropriate values of HS and LS may be used during the precharge phase to control the precharging of the various CDAC capacitors, respectively, in accordance with the particular precharge strategy being used.

Various implementations of SAR ADCs that execute the well known basic SAR algorithm are widely used, and can be readily implemented by those skilled in the art. For example, the assignee's TSC2007, TSC2005, TSC2003, TSC2046, ADS7846 all include similar SAR ADC circuits which could be used.

Figure 2B:
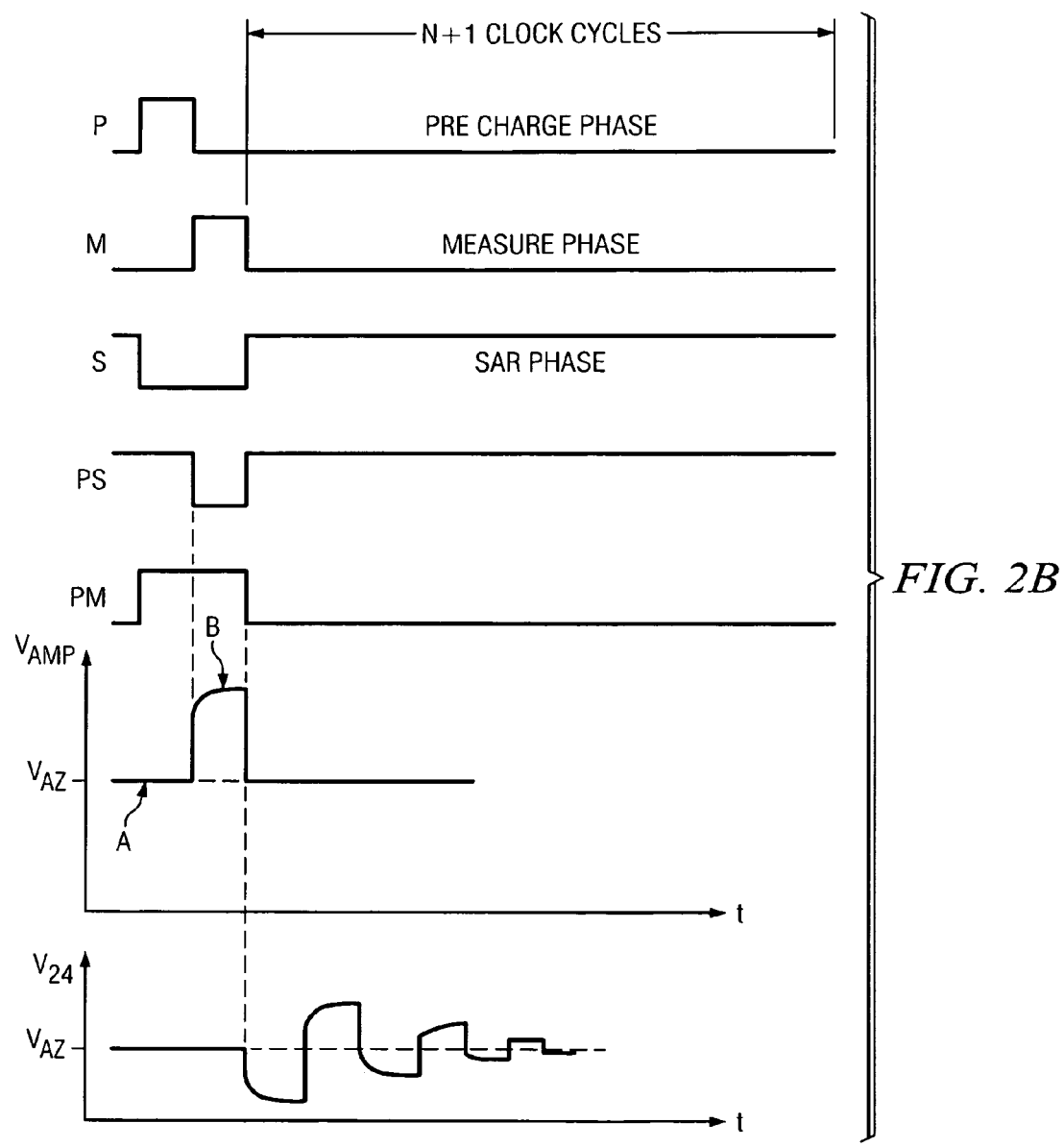
FIG. 2B is a timing diagram of clock signals used to operate the capacitance measurement system of FIG. 2A.

Above-mentioned FIG. 2B is a timing diagram including the digital signal P which represents the precharge phase of active gain capacitance measurement system 15, the digital signal M which represents the measurement phase, and a digital signal S which represents an SAR analog-to-digital conversion phase. Timing diagram FIG. 2B also shows a digital signal PS which is the inverse of the signal M and a digital signal PM which is the inverse of the signal S. Switch $S1j$ is controlled by precharge phase signal P. Switches $S2j$ and S0 . . . Sk . . . Sn are controlled by measurement phase signal M. Switch S6 is controlled by clock signal PM, switches S7k are controlled by clock signal PS, and switches S8k are controlled by SAR phase clock S, where k has all of the values between 0 and n. The waveforms of the amplifier output $V_{AMP}$ and the voltage $V_{24}$ on top plate conductor 24 also are shown.

FIG. 2A shows the configuration of the various switches of active gain capacitance measurement system 15 during the precharge phase wherein amplifier 31 is used to precharge the bottom plate conductors 21-0 . . . 21-k . . . 21-n and wherein switches S7k and S8k of switch bank 30 are open and inactive. During precharge phase P, switches S1j, S6, S9, and S25i are closed. Switches S0 . . . Sk . . . Sn also are closed. Switch S2j and all of switches S7k and S8k are open. In this configuration, the touchscreen capacitance $C_{SENij}$ being measured is discharged to ground through switch S1j. Since unity-gain switch S9 is closed, the voltage $V_{20}$ of measurement conductor 20 is equal to the amplifier output voltage $V_{AMP}$ on conductor 20A.

Since switch S6 is closed, amplifier 31 operates to precharge top plate conductor 24 of divider/feedback CDAC 23 to $V_{AZ}$ (which may be equal to $V_{DD}/2$) prior to the measurement phase (wherein charge redistribution occurs between $C_{SENij}$ and the capacitors of divider/feedback CDAC 23.) Since amplifier 31 is set in its unity gain configuration and CDAC 23 is coupled as a feedback network between the output 20A and (−) input of amplifier 31, the bottom plate conductors 21-0 . . . 21-k . . . 21-n capacitors of divider/feedback CDAC 23 also are precharged to $V_{AZ}$, so CDAC 23 is precharged to a value of 0 volts during the precharge phase.

By way of definition, the term "precharge" as used herein during any precharge phase, may include "precharging" at least some of the CDAC capacitors during the previous measurement phase simply by leaving the results of that measurement phase on those CDAC capacitors.

Figure 2C:
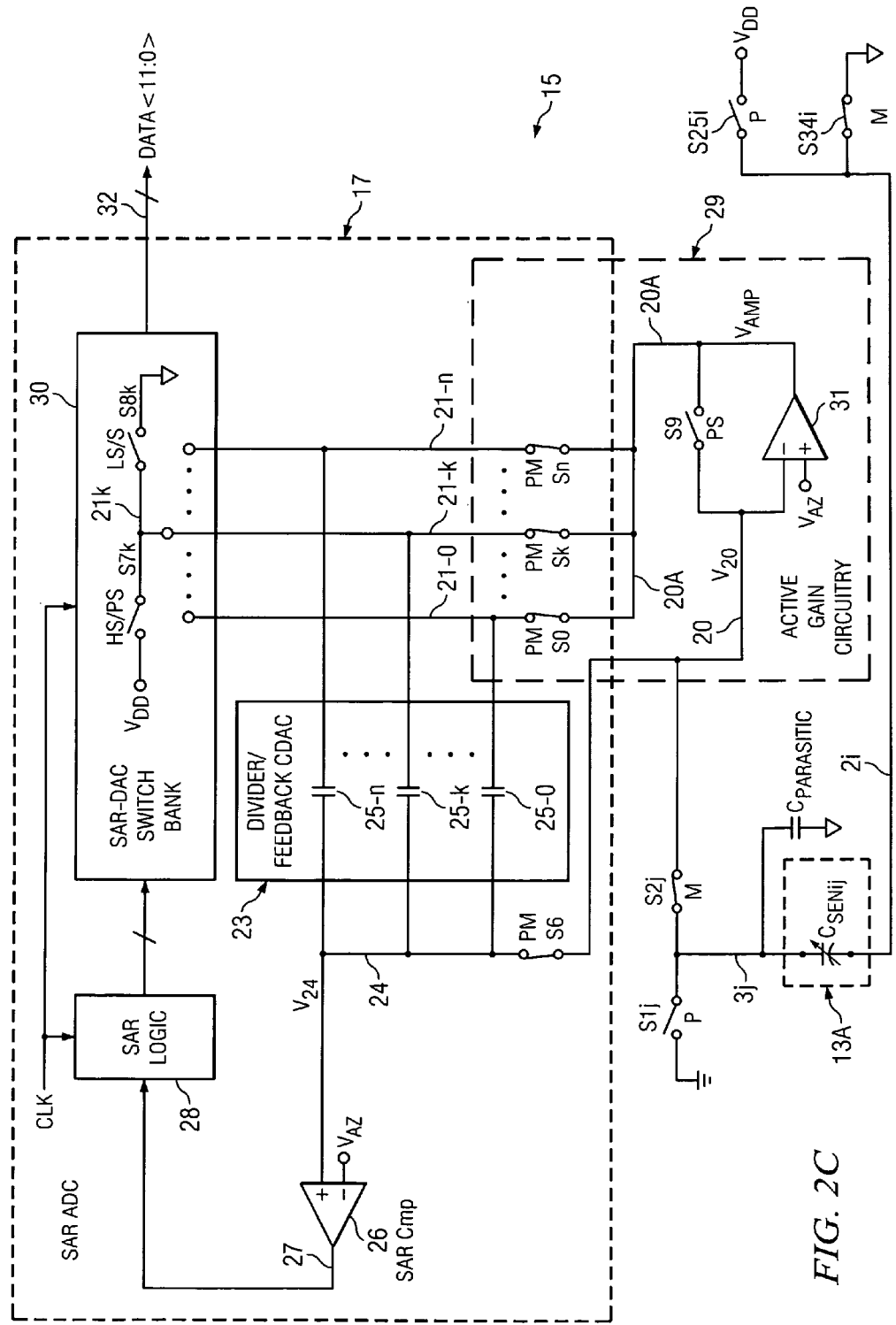
FIG. 2C is a block diagram useful in explaining operation of the capacitance measuring system of FIG. 2A during a measurement phase.

FIG. 2C shows the configuration of the various switches of capacitance measurement system 15 of FIG. 2A during the measurement phase, while clock signal M is at its high level as indicated in FIG. 2B. Switches S2j, S6, and S34i are closed. Switches S0 . . . Sk . . . Sn usually are closed, although in some cases one or more of switches S0 . . . Sk . . . Sn may be open to allow use of SAR banks switches S7k and S8k to configure the amount of CDAC capacitance to be involved in the charge transfer process (k being the above mentioned index variable having values between 0 and n). Some or all of the bottom plate conductors 21-0 . . . 21-k . . . 21-n of divider/feedback CDAC 23 (depending on the precharge strategy being used) have been precharged through some or all of switches S7k to a suitable reference voltage, for example, $V_{DD}$, and then disconnected therefrom. With interface switches S0 . . . Sk . . . Sn closed, and connecting amplifier output conductor 20A to bottom plate conductors 21-0 . . . 21-k . . . 21-n of divider/feedback CDAC 23, the charges produced during the precharge phase on $C_{SENij}$ and at least some of CDAC capacitors 25-0 . . . 25-k . . . 25-n are redistributed among the various capacitors that are connected together.

The charge redistribution causes a corresponding change in the voltage $V_{20}$ on measurement conductor 20. Amplifier 31 operates to equalize the voltages on its (−) and (+) inputs, thereby producing a corresponding change in $V_{AMP}$ and hence on CDAC bottom plate conductors 21-0 . . . 21-k . . . 21-n. Since switch S9 is open, amplifier 31 generates a value of $V_{AMP}$ which is proportional to the ratio of the capacitance $(C_{SENij}+C_{PARASITIC})$ divided by the total $C_t$ of the CDAC capacitances. (Note that although the auto-zeroing operation continues so that at this point the voltage on the (+) input of SAR comparator 26 has not changed, the auto-zeroing of SAR comparator 26 does not necessarily have to continue during the capacitance measurement phase. Auto-zeroing is not even essential to all embodiments of the present invention.)

It should be appreciated that, depending on the expected value of $C_{SENij}$, it might be desirable to not connect all of the CDAC capacitors into the foregoing capacitive divider configuration during the measurement phase. For example, only the MSB CDAC capacitor might be included in the divider configuration. Alternatively, the bottom plate conductors 21-0 . . . 21-k . . . 21-n being referred to could have been precharged to some other suitable reference voltage between $V_{DD}$ and ground. For example, the CDAC bottom plate conductors 21-0 . . . 21-k . . . 21-n could have been precharged to zero and $C_{SENij}$ could be precharged to $V_{DD}$ for the measurement phase, again depending on the precharging strategy being used. This might even be necessary, depending on the needed ratio of the total CDAC capacitances and $C_{SENij}$ (plus its associated parasitic capacitance $C_{PARASITIC}$).

During measurement phase M, some or all of CDAC capacitors 25-0 . . . 25-k . . . 25-n are used in a capacitive divider charge transfer configuration. Since $C_{SENij}$ is connected in series with the CDAC capacitance $C_{CDAC}$ which is equal to the total capacitance of some or all of CDAC capacitors 25-0 . . . 25-k . . . 25, the charge redistribution results in a voltage which appears on $V_{AMP}$ conductor 20A, since during the measurement phase the voltage of top plate conductor 24 is fixed at $V_{DD}/2$. The voltage $V_{AMP}$ produced by amplifier 31 is dependent on the precharge voltages previously applied to CDAC 32 and to $C_{SENij}$ plus its associated parasitic capacitance $C_{PARASITIC}$. For example, during the measurement phase, the bottom terminal of $C_{SENij}$ (plus its associated parasitic capacitance $C_{PARASITIC}$) is grounded, and conductor 3j is connected to conductor 20. The unity-gain switch S9 is open. Conductor 20A is connected to all of the CDAC bottom plate conductors 21-0 . . . 21-k . . . 21-n. Amplifier 31 operates so as to cause $V_{20}$ to be equal to $V_{AZ}$. (Since no current can flow into amplifier 31, the only way that can happen is for amplifier 31 to cause charge to flow through CDAC 23. Whatever current flows through CDAC 23 also has to flow through $C_{SENij}$ (plus its associated parasitic capacitance $C_{PARASITIC}$). Even though the result depends on the voltages to which $C_{SENij}$ and CDAC 23 were precharged, amplifier 31 produces whatever value of $V_{AMP}$ is necessary to cause $V_{20}$ to be equal to $V_{AZ}$.)

Then $V_{AMP}$ conductor 20A is disconnected from bottom plate conductors 21-0 . . . 21-k . . . 21-n by interface switches S0 . . . Sk . . . Sn. The SAR conversion operation than can begin. (During the SAR operation, amplifier 31 is either in its unity gain configuration, waiting for the next precharge/measurement sequence, powered down, or in open loop configuration. Amplifier 31 is inactive during the SAR phase. The voltage on conductor 24 is provided as an input to comparator 26 and varies according to the SAR algorithm.)

Figure 2D:
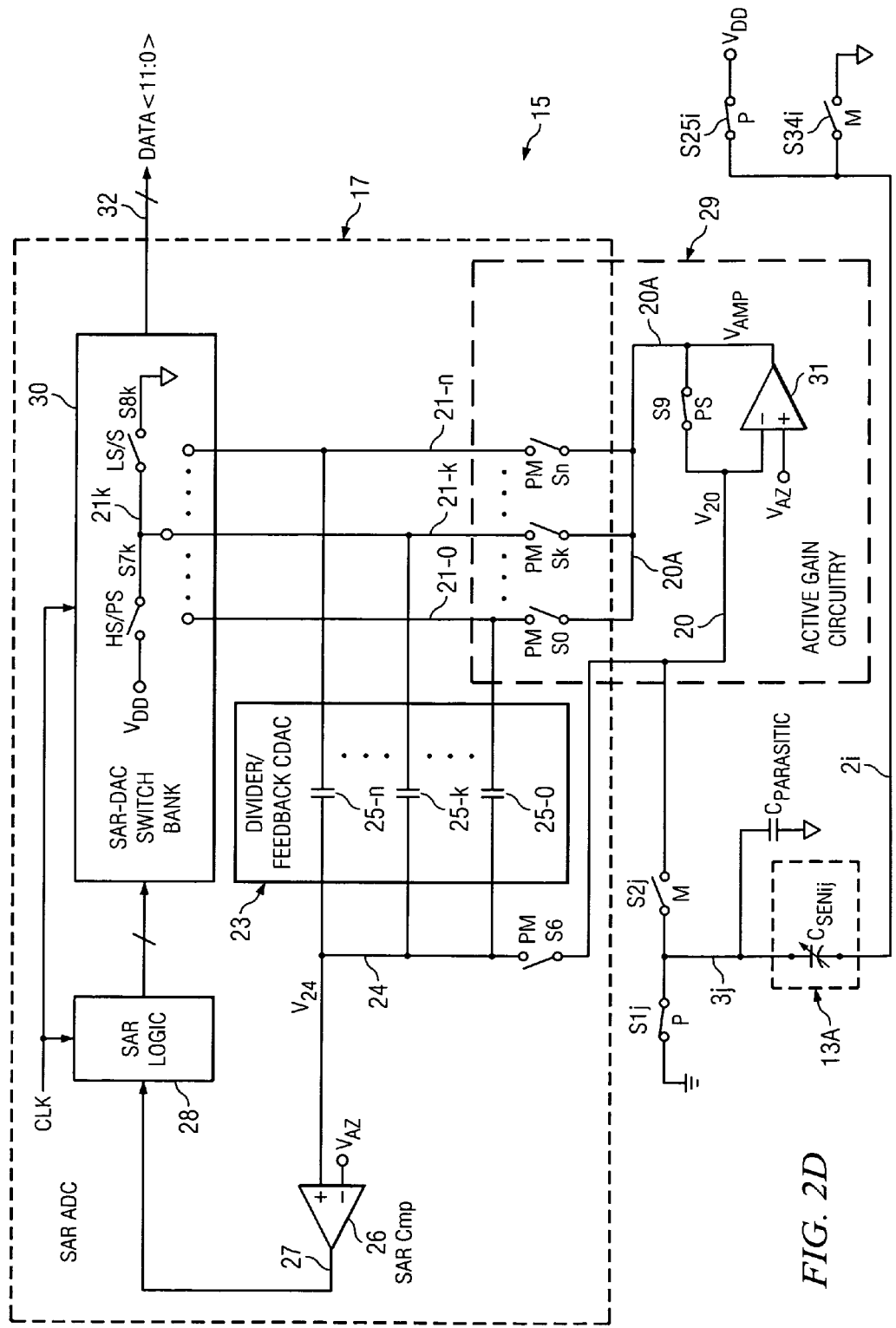
FIG. 2D is a block diagram useful in explaining operation of the capacitance measuring system of FIG. 2A during a SAR analog-to-digital conversion phase.

FIG. 2D shows the configuration of various switches of active gain capacitance measurement system 15 of FIG. 2A during the SAR analog-to-digital conversion phase, when clock signals S and PS are at a high level and clock signals P, M, and PM are at a low level as indicated in FIG. 2B. (The signals HS and LS have the same timing as signals PS and S, respectively, but have varying high or low values determined by the SAR ADC algorithm being executed.) During the SAR analog-to-digital conversion phase, switches S1j, S9, and S25i are closed and switches S2j, S6, S0 . . . Sk . . . Sn, and S34i remain open. Switches S7k and S8k are controlled by SAR logic 28 in accordance with the previously mentioned SAR conversion algorithm so as to cause SAR comparator 26 to test, bit by bit, the voltages produced on top plate conductor 24 as the bottom plates of the CDAC capacitors 25-0 . . . 25-k . . . 25-n, starting with the voltage on MSB CDAC capacitor 25-0, are sequentially connected to $V_{DD}$. The bottom conductors of the other CDAC capacitors are connected to ground through their corresponding switches S8k. Top plate conductor 24 therefore "floats" according to the actions of SAR DAC switch bank 30 until correct settings of S7k and S8k are achieved so as to cause the voltage of top conductor 24 to become equal to Vaz, at which point the settings of S7k and S8k represent the correct digital value DATA.

At the end of the measurement phase, the charge redistribution of the previously described measurement phase operation is complete, so the SAR conversion phase can begin. For the 12-bit case in which n=11, switches S0 . . . Sk . . . S11 and switch S6 are opened, at which point the "sampling" of $C_{SENij}$ by active gain circuitry 29 has been completed. SAR DAC switch bank 30 contains a total of 24 switches, in pairs. The bottom plate conductor of each CDAC capacitor, for example, the MSB CDAC capacitor 25-0), can either be pulled to $V_{DD}$ by a corresponding one of switches S7k, or it can be pulled to ground by a corresponding one of switches S8k of the same pair. (Of course, the two corresponding switches of a "k"th pair are never simultaneously asserted, i.e., one is never coupled to $V_{DD}$ while the other is coupled to ground.) For example, during the SAR conversion phase, the bottom plate of MSB capacitor 25-0 first is pulled to $V_{DD}$ by switch S7-0 (i.e., switch S7k where k=0) and all of the other less significant CDAC capacitors are pulled to ground by the appropriate S8k switches, and then top plate conductor 24 is compared to $V_{AZ}$.

If testing of the resulting voltage on top plate conductor 24 by SAR comparator 26 determines that the voltage on top plate conductor 24 is too high, then the bottom plate conductor of the corresponding MSB capacitor is pulled to ground by switch S8-0 (i.e., switch S8k where k=0), and the bottom plate conductors of all of the other less significant CDAC capacitors are pulled to $V_{DD}$ by the appropriate S7k switches. Then the next-most-significant (MSB-1) capacitor 25-1 is pulled to $V_{DD}$ and the voltage on top plate conductor 24 is tested, and so forth. Essentially the same procedure is successively repeated for all of the less significant bits.

Execution of the SAR ADC algorithm results in the stream of digital output DATA<11:0>, which indicates the values of the cross-coupling capacitances $C_{SENij}$ of touchscreen panel 13A. Once the SAR conversion is complete, the 12 bits of data generated by SAR DAC control circuit 30 represent the value of the voltage on $V_{AMP}$ conductor 20A immediately after the charge redistribution is complete. In a touchscreen controller, the digital output data DATA<11:0> can be readily used to determine the location of the particular touch point 13 on touchscreen panel 13A that has been touched by the finger of a user.

Capacitance measurement system 15 thus provides a switched capacitor network including transconductance amplifier 31, various switches, and CDAC 23 by using the CDAC in the feedback loop of the transconductance amplifier so that part of the time the CDAC functions as a feedback network and the other part of the time it is functions as a CDAC in a SAR ADC converter. This structure and technique saves a substantial amount of area on the integrated circuit chip by using the same CDAC capacitors both for performing a charge redistribution capacitance measurement and performing a SAR analog to digital conversion.

Figure 3A:
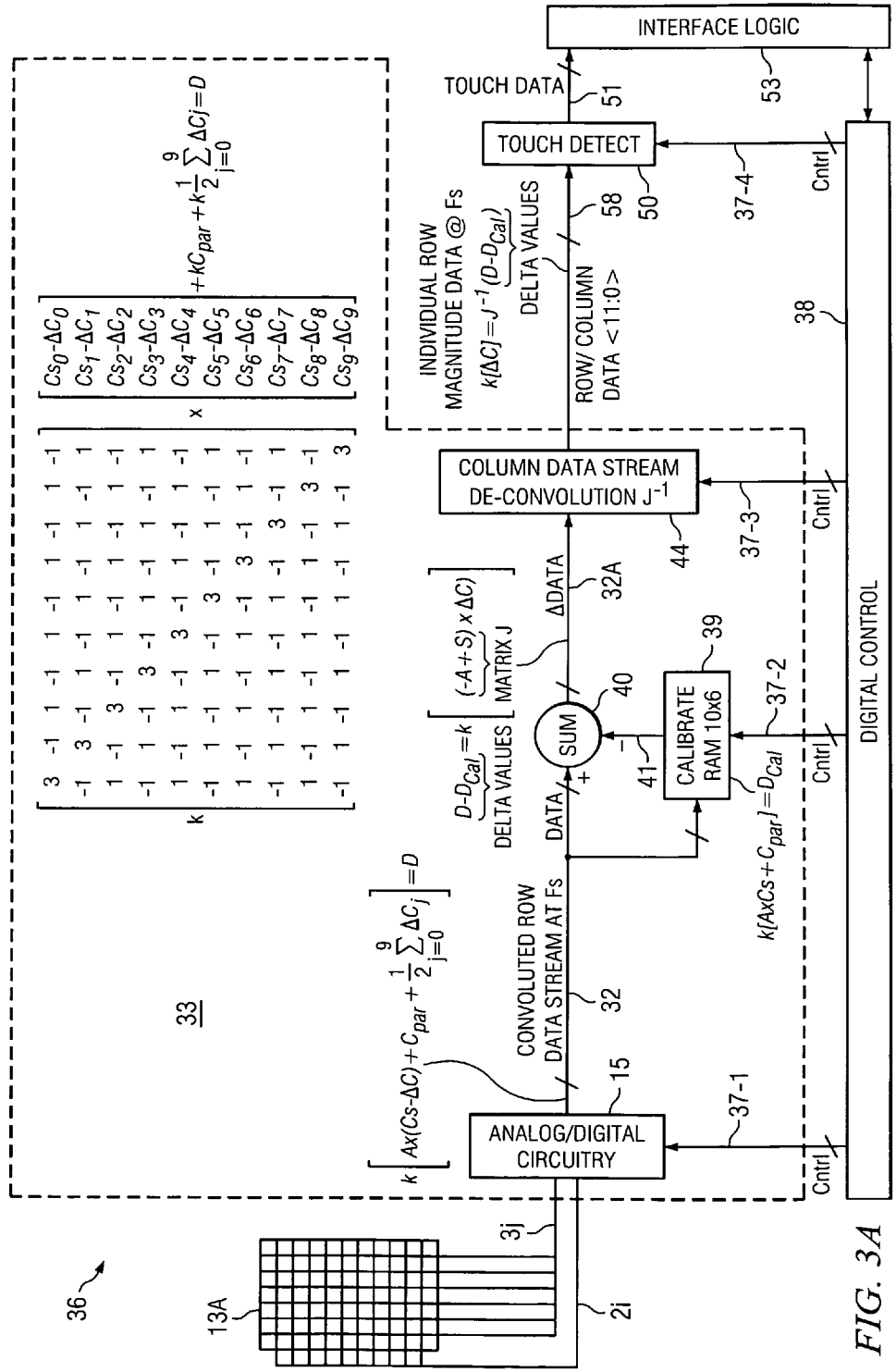
FIG. 3A is a block diagram of a touch screen controller system of the present invention.

FIG. 3A shows a touch screen controller system 36 which, in accordance with the present invention, may include an "analog/digital circuit" 15 as described above with reference to FIGS. 2A-2D, and further includes circuitry for performing, in effect, a "convolution" of all of the cross-coupling capacitances between all of the rows and any particular column of touch screen panel 13A into a column signal generated on a corresponding column conductor 3j. A change $\Delta C_{SENij}$ in the cross-coupling capacitance between a row conductor 2i and a column conductor 3j of touch screen panel 13A is caused by the presence of a finger touch on or close to that cross-coupling capacitance. The resulting column signal is later digitally "deconvoluted" to obtain a signal representing an amount of charge transferred from a particular one of the cross-coupling capacitances $C_{SENij}$ to the column conductor 3j. In the example of FIG. 3A, a 10 row by 6 column touch screen panel 13A is shown, corresponding to touch screen panel 13A in FIG. 2A. The row conductors 2i (where $0 \leq i \leq 9$) and column conductors 3j (where $0 \leq j \leq 5$) are connected to an input of analog/digital circuit 15, which can include touch screen controller circuitry 15 of FIG. 2A or other touch screen controller circuitry (not shown). Control signals for analog/digital circuit 15 are produced on bus 37-1 by a digital control circuit 38. (Of course, the touch screen panel 13A can have any suitable numbers of rows and columns.)

The upper matrix equation shown within dashed line 33 represents the process by which convoluted digital data DATA, also represented by D, is generated within analog/digital circuitry 15. Dashed line 33 and circles the system components that produce the convoluted digital data DATA and from it produce the deconvoluted data which is utilized to determine the location of the present touch on panel 13A.

The output signal DATA produced on digital bus 32 in FIG. 3A by analog/digital circuit 15 is applied to the (+) input of a digital summer 40. The output signal DATA on bus 32A may be represented by the expression $$k\left[A \times (C_S - \Delta C) + C_{par} + \frac{1}{2}\sum_{j=0}^{9} \Delta C_j\right] = D.$$

To determine where a touch has occurred on panel 13A, the signal DATA must first be "calibrated" by taking a measurement of each cross-coupling capacitance node on a full column. This initial data stream is represented by the equation $$k[A \times C_S + C_{par} + 0] = D_{Cal}.$$

Subsequent values of data, which are produced at the output of summer 40, are compared to this baseline to obtain $\Delta C_{SENij}$ values, or "delta" values. These values are represented by the equation $$k\left[-A \times \Delta C + \frac{1}{2}\sum_{j=0}^{9} \Delta C_j\right] = D - D_{cal}$$

It should be noted that the term "½" in the foregoing expression is a function of the particular panel being analyzed. The present analysis assumes that when a touch occurs, ½ of the ΔC charge is shunted to the row side, while the other ½ of the ΔC charge is shunted to the column side. However, in a different panel the term "½" could be replaced by a different fractional value. The largest delta value obtained from a full scan of touch panel 13A represents the "strongest" touch, the location of which is determined as subsequently explained. The "base line" or neutral values for all cross-coupling capacitances $C_{SENij}$ obtained from the initial scan of touch panel 13A with no finger touches thereon are stored in calibration memory 39.

The output 41 of calibration memory 39 is applied to the (−) inputs of summer 40, the (+) inputs of which receive the convoluted withdrawal DATA signal on bus 32. During normal operation, the base line data values stored in calibration memory 40 are subtracted from corresponding present values of DATA output by analog/digital circuit 15 by means of digital summer 40 to generate the "calibrated" data stream ΔDATA representing changes $\Delta C_{SENij}$ of any cross-coupling capacitance influenced by the presence of a finger. (Thus, during normal operation, if no finger touches are present on panel 13A, the output of digital summer 40 consists of all "0"s.)

The calibrated output data stream ΔDATA of summer 40 is represented by the expression $$D-D_{Cal}=k[(-A+S)\times\Delta C].$$

This data stream is produced on bus 32A and applied to the input of a column data deconvolution circuit 44. Deconvolution circuit 44 is controlled by signals produced on bus 37-3 by digital control circuit 38. The digital output of deconvolution circuit 44 is produced on digital bus 58, and can be represented by the expression $$k[\Delta C]=J^{-1}(D-D_{Cal}).$$

This signal on bus 58 is applied to the input of a touch detection circuit 50 which is controlled by signals produced on bus 37-4 by digital control circuit 38. The "touch location" data produced by touch detection circuit 50 is applied by means of digital bus 51 to the input of a suitable digital interface circuit 53 (which, for example, can be a conventional I²C interface circuit that produces a corresponding output signal on bus 55).

A touch panel "row drive" method according to the present invention is executed during precharge phase P and measurement phase M, as subsequently explained with reference to FIGS. 4 and 5 to generate a "convolution" or superpositioning of transferred charges on column conductor 3j. The resulting digital output DATA stream produced by SAR ADC 17 and calibrated by subtracting the base line values from it generates ΔDATA as a stream of values of $\Delta C_{SENij}$ which represent one or more present finger touches on panel 13A. The "convolution" introduced by the superposition of all of the touch screen panel row voltages onto any particular column conductor 3j then is "deconvoluted" by means of a subsequently described deconvolution process associated with block 44 in FIG. 3A.

Figure 3B:
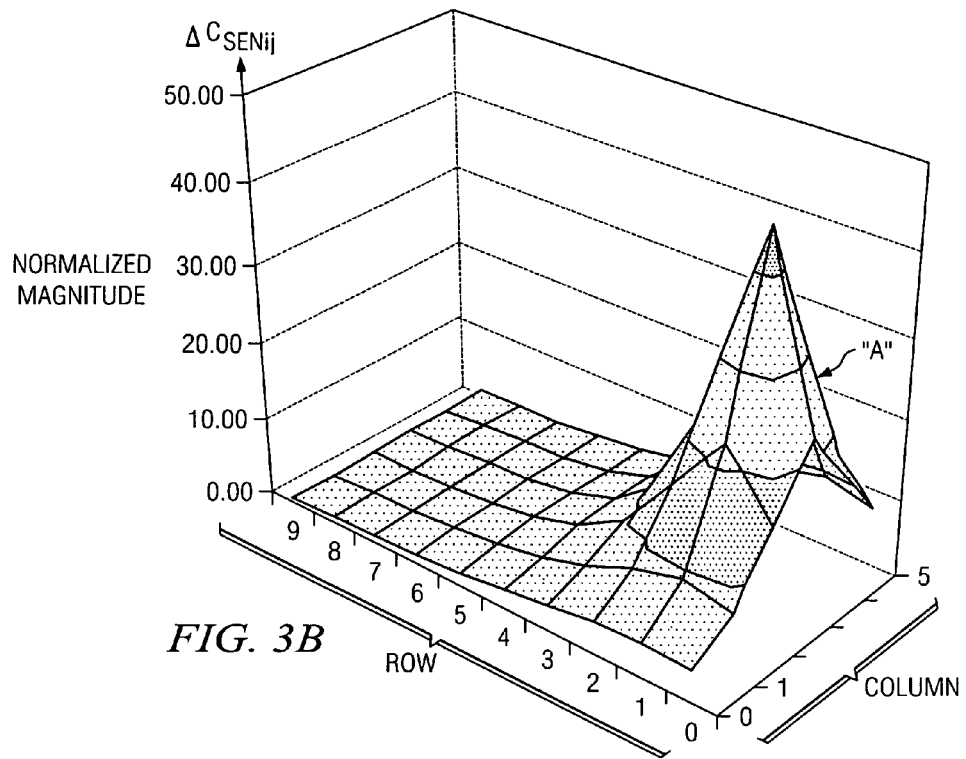
FIGS. 3B and 3C are three-dimensional views of maps representing absolute*capacitance changes caused by finger touches on a touch screen panel of the present invention.
Figure 3C:
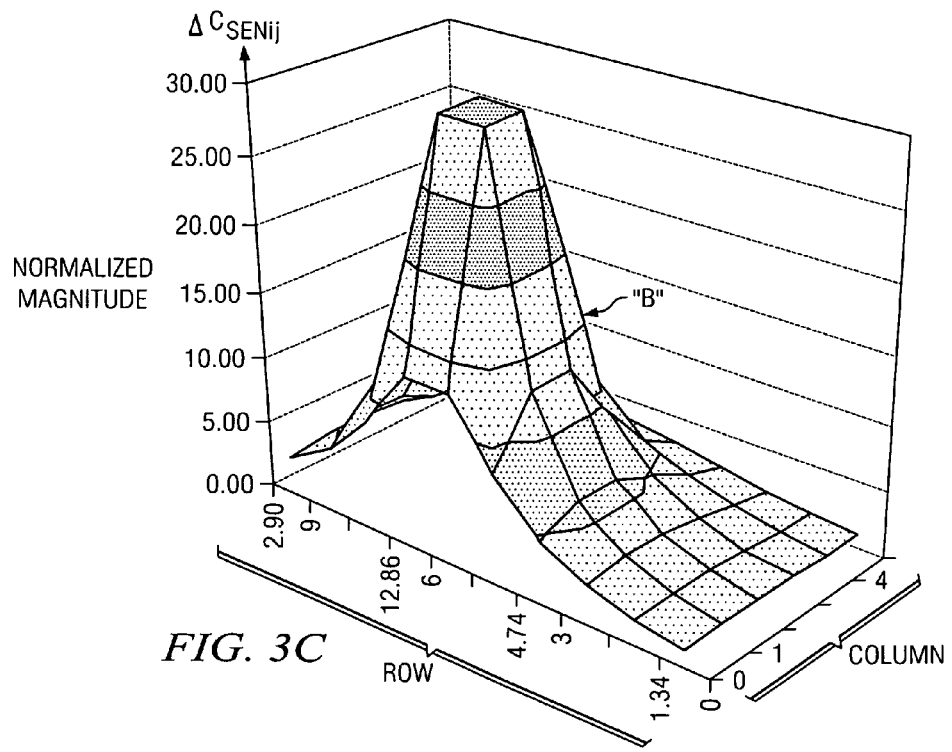
Figure 7:
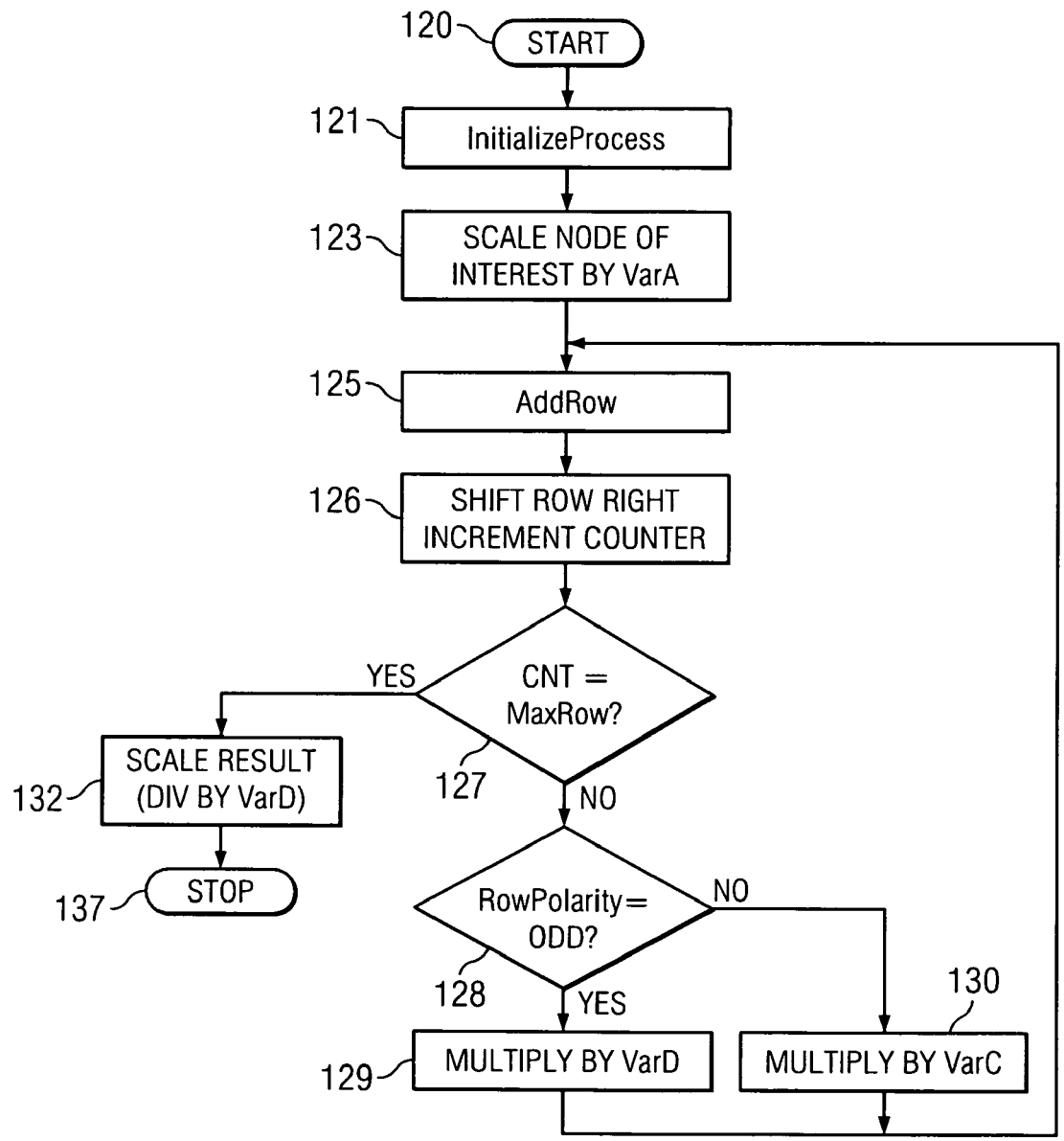
FIG. 7 is a flowchart that illustrates a deconvolution process in block 44 of FIG. 3D.

The output generated on digital bus 58 by deconvolution block 44 in accordance with the deconvolution algorithm of FIG. 7 represents a "magnitude map" of cross-coupling capacitances of touch screen panel 13A indicating any present finger touches thereon. The three-dimensional diagram in FIG. 3B illustrates a peak "A" in a magnitude map for a normal finger touch on panel 13A directly over a corresponding cross-coupling capacitance $C_{SENij}$, which is also referred to herein as a "node" of panel 13A. FIG. 3C illustrates a peak "B" in the magnitude map for a normal finger touch on panel 13A located midway between four adjacent cross-coupling capacitances or "nodes".

As subsequently explained with reference to touch detection circuit 50 and the touch detection algorithm of FIG. 8, the magnitude map is searched for the largest magnitude peaks, such as peak "A" in FIG. 3B and peak "B" in FIG. 3C. The largest peak values of $\Delta C_{SENij}$ will occur when a touch is located directly over a single cross-coupling capacitance $C_{SENij}$ of touch screen panel 13A. As the finger touch moves away from this node, the magnitude of the peak will decrease. FIG. 3F illustrates the arrangement of the "nodes" in a 10 row by 6 column example of touch screen panel 13A. As the touch moves from Node 0 to Node 1, it can be seen that the magnitude of the cross-coupling capacitance changes $\Delta C_{SENij}$ for Node 0 and Node 1 decrease and increase, respectively, as a finger touch moves away from Node 0 toward an adjacent second cross-coupling capacitance "Node 1". The graph in FIG. 3E also shows the corresponding change in the value of the second cross-coupling capacitance "Node 1". (The magnitude of the peak shown in FIG. 3C is less than in FIG. 3B because of this effect.)

In the described example, if a touch is located directly above Node 0, the magnitude of capacitance change of Node 0 will be 45 DATA "codes" generated by SAR ADC 17 (FIG. 2A), wherein each such code, which may have a value from 0 to 4095, represents a specific integer output which represents some value of capacitance. The value of capacitance change $\Delta C_{SENij}$ for Node 1 in FIG. 3E, which is the next node or cross-coupling capacitance $C_{SENij}$ of the same column 3j, would be 23 codes. As an example, assume Node 0 has a magnitude of 42 codes and Node 1 has a magnitude of 28 and codes. Referring to FIG. 3E, it can be seen with these values that the touch occurs closest to Node 0, about 25% of the distance between the Node 0 and Node 1.

Because of the relationship shown in FIG. 3E, if the $\Delta C_{SENij}$ values of two adjacent nodes are known, then it can be determined precisely where a touch has occurred between those two nodes. For this reason, it is appropriate for the output 51 of touch screen controller system 36 of FIG. 3A to represent the occurrence of each single touch to the user as 6 pieces of data, including the value of the maximum $\Delta C_{SENij}$ in the magnitude map, the location of that maximum $\Delta C_{SENij}$ in the magnitude map, and the $\Delta C_{SENij}$ magnitudes and locations of the larger $\Delta C_{SENij}$ of the two adjacent row nodes and the $\Delta C_{SENij}$ magnitudes and locations of the larger $\Delta C_{SENij}$ of the two adjacent column nodes. The user then can use this information to extrapolate the present location of a finger touch between various nodes.

Although analog/digital circuit 15 may include the circuit 15 in FIG. 2A, it should be understood that the convolution/deconvolution technique of the present invention may be implemented using a different analog/digital circuit. For example, a basic implementation of the analog/digital circuit 15 in FIG. 3A could simply include a switched capacitor amplifier having its output coupled to the input of a subsequent ADC to produce the digitized output signal DATA, but such an implementation would require a larger amount of power dissipation.

Figure 3D:
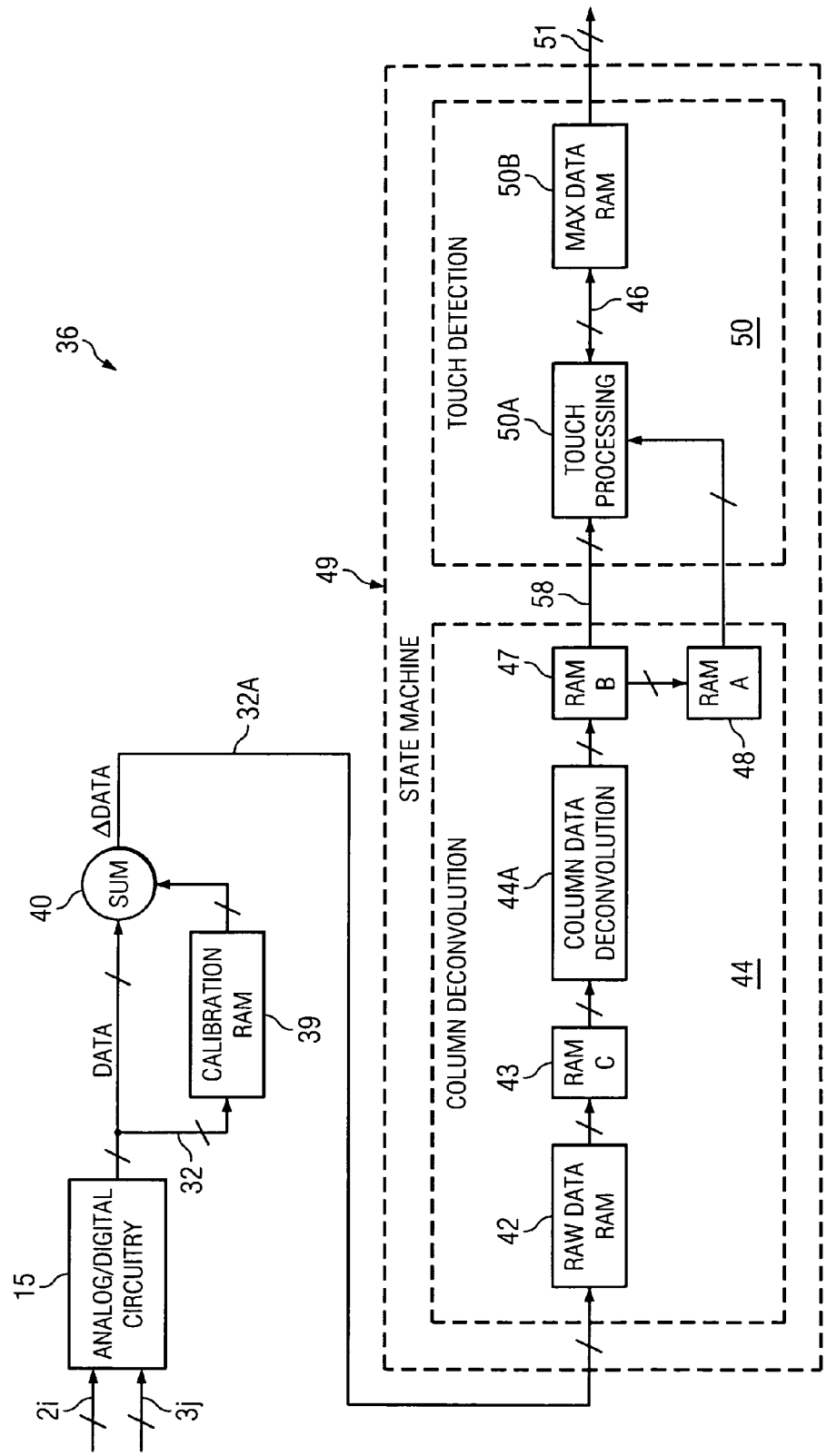
FIG. 3D is a more detailed block diagram of the touch screen controller system shown in
FIG. 3A.
Figure 3E:
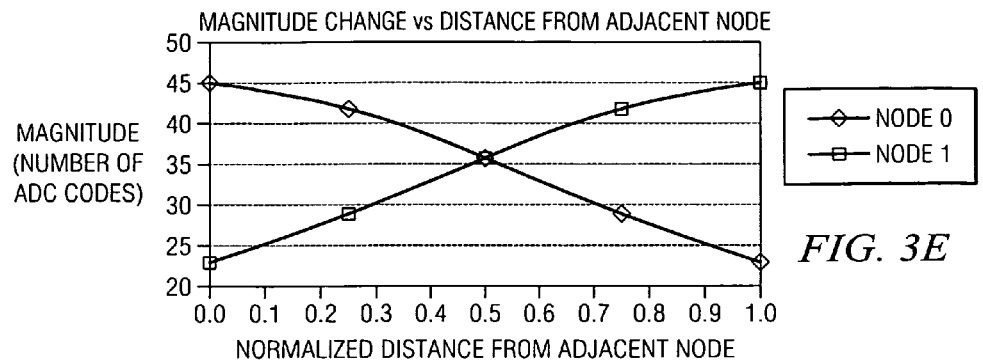
FIG. 3E is a graph which illustrates magnitude of touch capacitance change versus touch point distance between adjacent cross-coupling capacitance nodes of a touch screen of the present invention.
Figure 3F:
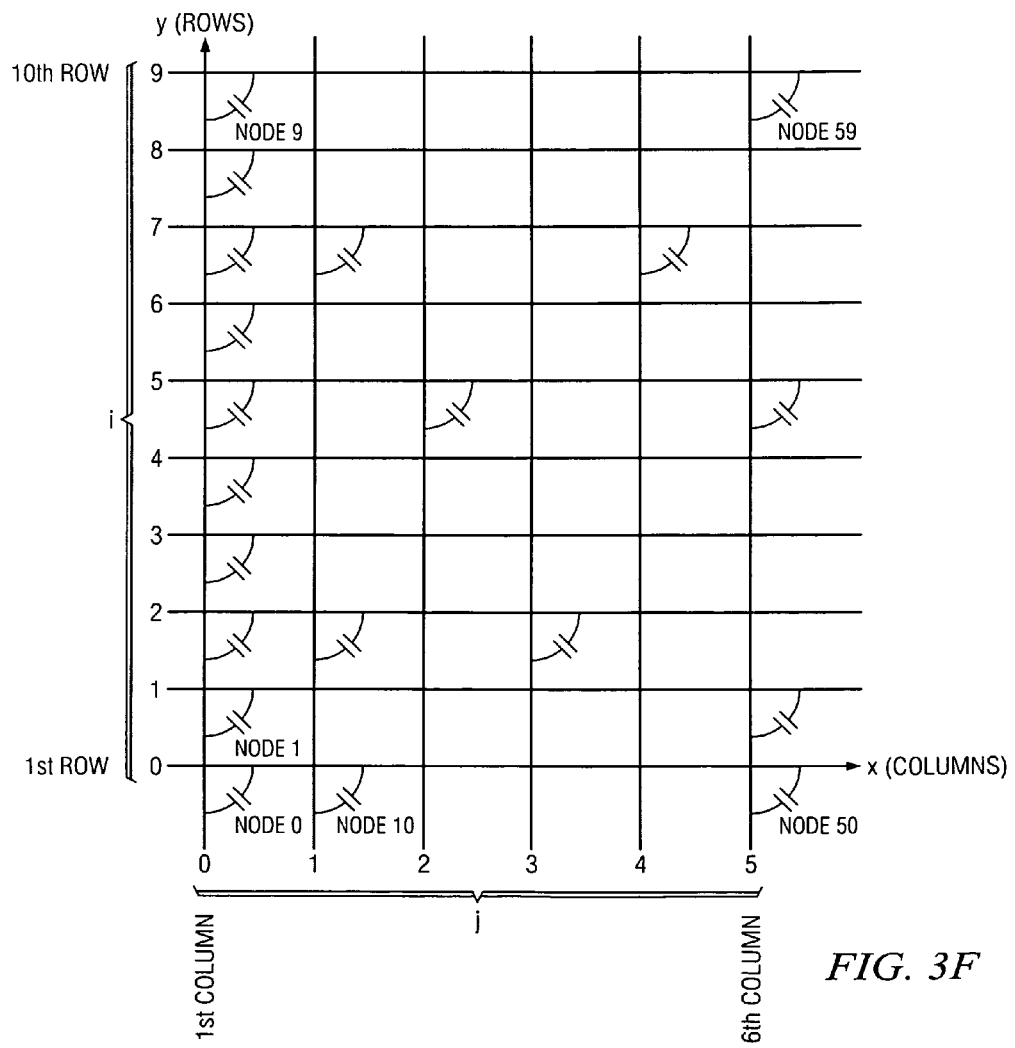
FIG. 3F is a diagram which illustrates a convenient way of designating the order of operating on cross-coupling capacitances or "nodes" of a touch screen panel during deconvolution and touch detection procedures.

FIG. 3D shows additional details for deconvolution block 44 and touch detect block 50 in FIG. 3A. Deconvolution block 44 in FIG. 3D includes a "raw data" memory 42 which receives and temporarily stores calibrated ΔDATA output values from digital summer 40 representing the $\Delta C_{SENij}$ data (i.e., the node data) of the column 3j most recently scanned in touch screen panel 13A. Raw data RAM 42 is coupled to another memory 43 labeled "RAM C", the output of which is coupled to the input of column data deconvolution circuit 44A in which the deconvolution process of subsequently described FIG. 7 is performed. The output of deconvolution circuit 44A is stored in another memory 47 labeled "RAM B". Memory 47 is coupled to another memory 48 labeled "RAM A" and also to touch processing circuit 50A in which the touch detection process of subsequently described FIG. 8 is performed to determine the location of a valid touch on touch screen panel 13A. The output of touch processing circuit 50A, which is included in touch detection circuit 50, is coupled by bidirectional bus 46 to another memory 50B labeled "MAX DATA RAM", the output of which is coupled to digital bus 51. The coupling between touch detection circuit 50A and MAX DATA RAM 50B is bidirectional to facilitate the process of subsequently described FIG. 8. Column deconvolution circuit 44 and touch detection circuit 50 can be readily implemented by one skilled in the art as a state machine 49.

Before proceeding to further description of the operation of touch screen controller system 36, it may be helpful to understand how the various Nodes 0-59 of the described example of a 10 row by 6 column touch screen panel 13A are arranged with respect to rows 0-9 and column 0-5. Referring to FIG. 3F, column 0 includes Nodes 0 through 9, with Node 0 located in the bottom left-hand corner and Node 9 in the top left-hand corner. Column 1 includes Nodes 10-19, column 2 includes Nodes 20-29, and so forth. Column 5 includes Node 50 in the bottom right-hand corner and node 59 in the upper right-hand corner.

Processing of column 0 includes obtaining measurements of Node 0 through Node 9 (i.e., obtaining values of DATA on bus 32 which represent $C_{SENij}$ for each of Nodes 0-9 and calibrating those values by subtracting corresponding baseline values $C_{SENij}$ from them to obtain corresponding values $\Delta C_{SENij}$ and presenting those values as the signal $\Delta$DATA on bus 32A. The values of $\Delta$DATA are what is processed in deconvolution circuit 44.

Analog/digital circuit 15 produces a stream of data corresponding directly to signals received from touch screen panel 13A. This data is convoluted because of the superposition that occurs as a result of simultaneously driving all of the row conductors 2i. The $\Delta$DATA values obtained for the present column 3j is stored in raw data memory 42 of FIG. 3D. Once an entire column of data has been collected, it is moved to RAM C, i.e., memory 43. The data in memory 43 is used within deconvolution circuit 44A to deconvolute the data from memory 43. The deconvoluted data is transferred to stored RAM B, i.e., memory 47. Once the entire first column has been processed in deconvolution circuit 44, then touch processing circuit 50A of detection circuit 50 can begin processing the deconvoluted data. When the second column of data starts to be processed, then the data in memory 47 is moved to RAM A, i.e., to memory 48. Memory 47 will always store the current node being processed within the touch processing circuit 50A, plus the nodes below within the same column. Memory 48 also will always store the data for the column to the left of the current node being processed.

As touch processing circuit 50A processes data, it stores values and evaluates "maximum" $\Delta C_{SENij}$ values stored in Max Data memory 50B. As subsequently explained, the touch detection algorithm shifts certain data from memory 47 or memory 48 into Max Data memory 50B in order to make that data available as needed during execution of the touch detection algorithm of FIG. 8. After deconvolution of $\Delta$DATA for all columns of touch screen panel 13A, a value of $\Delta C_{SENij}$ has been provided for each of Nodes 0-59 and can be represented in a 3-dimensional plot or magnitude map of the panel 13A, for example as shown in FIGS. 3B and 3C.

The design of the present invention uses the concept of superposition to generate the magnitude map of any particular capacitive touch panel for detection of one or two present touches thereon. The above described circuit model includes the cross-coupling capacitances $C_{SENij}$ and various parasitic capacitances to ground associated with the various row conductors 2i (e.g., $0 \leq i \leq 9$) and column conductors 3j (e.g., $0 \leq j \leq 5$). In the described example, the superposition or convolution referred to occurs because all of the row conductors 2i of panel 3A are driven simultaneously, some row conductors being driven to different voltages than others. (Note however, that the row conductors 2i could be driven non-simultaneously or sequentially, as long as they all are driven to their desired values before the output of amplifier 31 is utilized to accomplish the previously described CDAC voltage division.) The "row drive function" for each row conductor 2i causes that row conductor to make its own separate charge transfer contribution to the column signal generated by the charge transfers from all of the row conductors 2i to each column conductor 3j as a function of how each row conductor is being driven.

In the described example, each row conductor 2i is driven so as to precharge and sample its associated $C_{SENij}$ (and associated parasitic capacitances) in order to transfer a $3q$, $q$, or $-q$ amount of charge to column conductor 3j, as subsequently explained with reference to FIG. 5. In the described example, 10 rows are driven, and resulting superimposed or convoluted signals are coupled to each of the 6 column conductors 3j, respectively. All rows contribute simultaneously to the convoluted column signal on each column conductor 3j, respectively, depending on how each row is driven (i.e., so as to transfer a $3q$, $q$, or $-q$ amount of charge to a particular column conductor 3j).

Since the column signal of a particular column conductor 3j is a linear function of all charge transfer contributions of all of the rows to that particular column conductor 3j, column signals can be deconvoluted to obtain the values of each of the cross-coupling touch capacitances, including the one or more cross-coupling capacitances influenced by a user's finger, and thereby determine its location on the touch screen panel.

Figure 4:
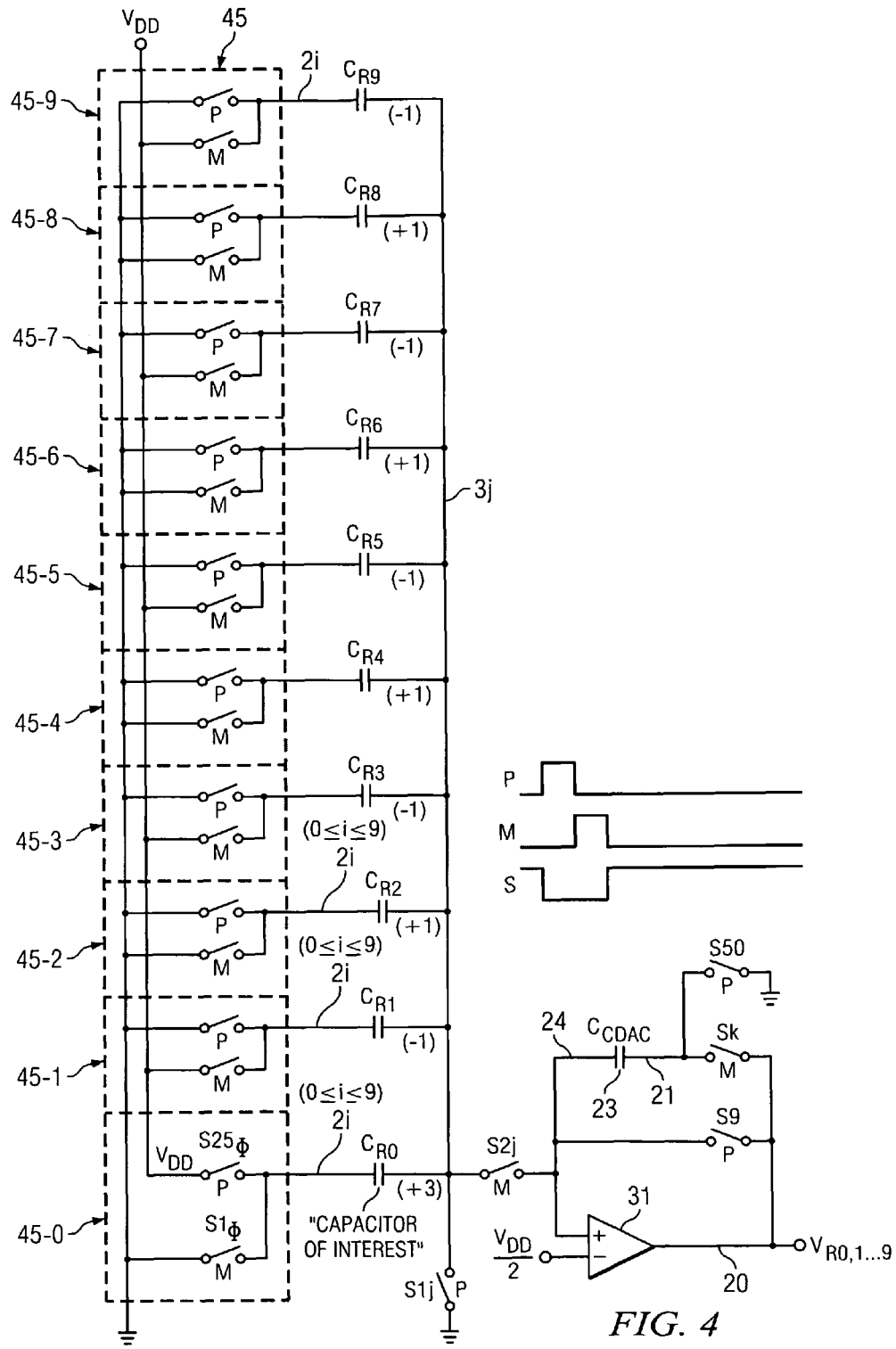
FIG. 4 is a schematic diagram useful in explaining all row, single column measurement operations in the touch screen controller system of FIGS. 3A and 3D.

FIG. 4 shows a configuration of row drive circuitry 45, including 10 row driver circuits 45-0, 1, 2 . . . 9 the outputs of which are connected by a corresponding row conductor 2i ($0 \leq i \leq 9$), respectively, to a first terminal of each of 10 corresponding cross-coupling capacitances $C_{SENij}$. For convenience in the subsequently described equations and matrices, the corresponding capacitances (i.e., node values) are labeled $C_{R0,1 \ldots 9}$, respectively, in FIG. 4. The second terminal of each cross-coupling capacitance $C_{R0,1 \ldots 9}$ is connected to a single column conductor 3j ($0 \leq i \leq 9$). Each row conductor 2i is coupled to the first terminals of a corresponding P-controlled switch and a corresponding M-controlled switch. For the purpose of an initial driving of the 10 row conductors 2i, only cross-coupling capacitance $C_{R0}$ is considered to be the "capacitance of interest", and the second terminal of its corresponding P-controlled switch is connected to $V_{DD}$ and the second terminal of its corresponding M-controlled switch is connected to ground. (Subsequently, each of the remaining cross-coupling capacitors $C_{R0,1 \ldots 9}$, one at a time, becomes the present "capacitance of interest".)

The first terminal of capacitance of interest $C_{R0}$ is coupled by its corresponding P-controlled switch to $V_{DD}$ and is also coupled by its corresponding M-controlled switch to ground. However, the first terminal of capacitance $C_{R1}$ is coupled by its corresponding P-controlled switch to ground and is also coupled by its corresponding M-controlled switch to $V_{DD}$. Similarly, the first terminal of capacitance $C_{R2}$ is coupled by its corresponding P-controlled switch to ground and is also coupled by its corresponding M-controlled switch to ground. The first terminal of capacitance $C_{R3}$ is coupled by its corresponding P-controlled switch to $V_{DD}$ and is also coupled by its corresponding M-controlled switch to ground. This general pattern of connection is repeated for capacitances $C_{R4,5, \ldots 9}$.

As in FIG. 2A, column conductor 3j is coupled to ground by P-controlled switch S1j, and column conductor 3j also is coupled by M-controlled switch S2j to the (+) input of amplifier 31. The (−) input of amplifier 31 in FIG. 4 is coupled to a suitable reference voltage, which can be equal to $V_{DD}/2$. The output conductor 20 of amplifier 31 is coupled by P-controlled switch S9 to the (+) input of amplifier 31 and by multiple M-controlled switches Sk to corresponding bottom plate conductors 21 of CDAC 23, as in FIG. 2A. The (+) input of amplifier 31 also is connected to top plate conductor 24 of CDAC 23. Multiple conductors 21 are connected by corresponding P-controlled switches S50 to ground.

In operation of the circuitry shown in FIG. 4, each of the 10 row conductors 2i is driven individually, generally in the manner indicated, such that during the precharge phase P the "capacitance of interest", for example $C_{R0}$, is charged and sampled so as to transfer an amount $3q$ of charge to column conductor 3j and the remaining 9 alternate cross-coupling capacitances are charged and sampled so as to transfer charge amounts of +q and −q, respectively, to column conductor 3j. During the measurement phase M, charge from all 10 of the cross-coupling capacitances $C_{R0,1\ldots9}$ is transferred to the single column conductor 3j, thereby convoluting or superimposing all of the transferred charge from cross-coupling capacitances $C_{R0,1\ldots9}$ onto the single column conductor 3j.

Then the foregoing operation is, in essence, repeated for the case in which the next cross-coupling capacitance $C_{R1}$ becomes the capacitance of interest, and so on until the procedure has been performed on all of capacitances $V_{R0,1\ldots9}$. During the course of a complete scan of a particular column 3j, each of the 10 cross-coupling capacitances $C_{R0,1\ldots9}$, one at a time, becomes the present "capacitance of interest".

It should be understood that there can be a separate amplifier 31 for each of the 6 column conductors 3j, respectively. Although it is necessary in the described example to scan one column 3j at a time and only a single amplifier 31 is shown, there could be a separate amplifier 31 for each column. Also, for faster operation, an ADC could be provided for each column 3j in FIG. 4 and all columns could be scanned simultaneously so deconvolutions for each column could be performed simultaneously.

It should be understood that since all 10 row conductors 2i are always involved in transferring charge from the cross-coupling capacitances $C_{R0,1\ldots9}$ to column conductor 3j, a "magnitude output" corresponding to the present cross-coupling capacitance of interest cannot be derived by means of a single processing of the voltage produced on column conductor 3j due to charge transferred from the present capacitance of interest. Only full scanning of the column conductor 3j generally as described above and subsequent deconvolution of the signal produced thereon by the charge transfer can be utilized to determine the magnitude of the change in capacitance change $\Delta C_{SENij}$ of the present capacitance of interest. The same is true for the transferring of charge from the various cross-coupling capacitances or nodes between all 10 row conductors 2i and each of the other column conductors 3j.

Figure 5:
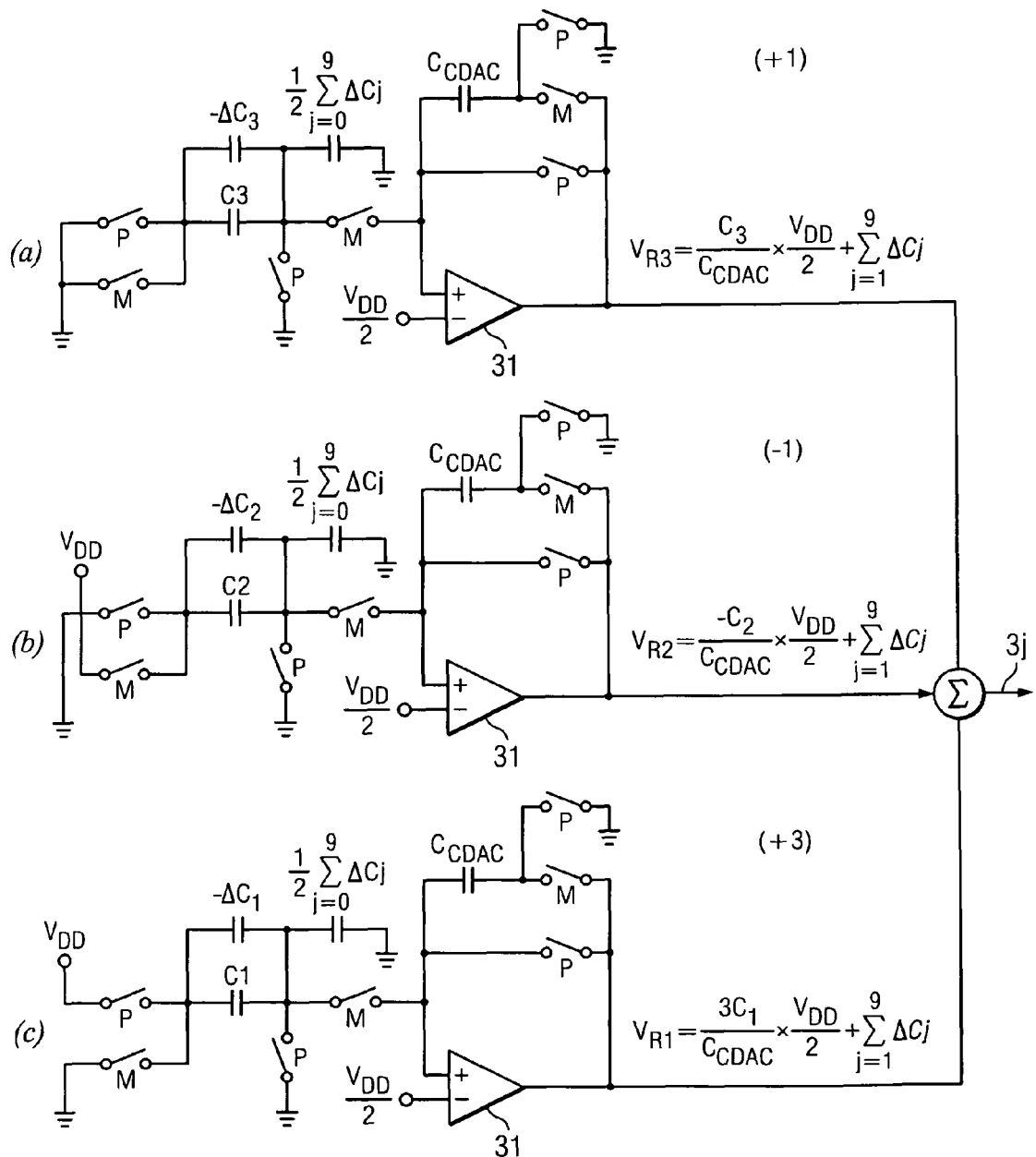
FIG. 5 is a schematic diagram illustrating one row driving technique for achieving charge transfer by superposition/convolution operation in the touch screen controller illustrated in FIGS. 3 and 4.

FIG. 5 shows a diagram which is useful in further explaining the basic row driving technique according to the present invention, wherein various amounts of charge are transferred to a single column conductor 3j ($0 \leq j \leq 5$) from all of the cross-coupled capacitances coupling the single column conductor to the 10 row conductors 2i ($0 \leq i \leq 9$) in panel 13A. The cross-coupling capacitors or nodes are precharged in such a way that during the measurement phase a larger amount of charge transferred from the cross-coupled capacitance or node of interest is transferred via column conductor 3j to the input of amplifier 31 and lower, opposite-polarity amounts of charge on the other cross-coupling capacitances are largely canceled out so as to prevent an excessive amount of charge from being transferred to the input of amplifier 31 and saturating it.

In FIG. 5, the illustrated equivalent circuitry for 3 rows is shown as 3 sections (a), (b), and (c), the outputs of which are summed together, in order to illustrate the superposition of voltages that occur to result in a "convolution" of the row voltages, so as to generate a summation of voltage components on the column conductor 3j due to the various separate transfers of charge, respectively. In each case, the summation voltage is amplified by amplifier 31. It should be understood that three circuit sections (a), (b), and (c) as shown in FIG. 5 are not actually connected together in the real circuit. The $V_{R1}$, $V_{R2}$ and $V_{R3}$ expressions included in FIG. 5 indicate the three output voltage components of the amplifier 31 that would be individually generated by the voltage division that occurs when the cross-coupling capacitance $C_{Ri}$ in the "row of interest" and the next two adjacent rows, respectively, are driven to voltages which result in charge transfers of "$3q$", "$-q$", and "$+q$" from $C_{Ri}$, $C_{Ri+1}$, and $C_{Ri+2}$, respectively to the CDAC capacitance $C_{CDAC}$ during the measurement phase. (Various other ways and voltage magnitudes for driving the various row conductors could be provided. However, the above described way of driving the rows of touch screen panel 13A is believed to be optimal because it generates the most charge redistribution for the panel column of interest and minimizes the charge redistribution of the nodes which are not of interest.)

In the "no touch" condition, touch panel 13A has a cross-coupling capacitance value of C for any particular node. However when a finger touch occurs in proximity to a node, the cross-coupling capacitance C across the row/column intersection is reduced by $\Delta C$, which is illustrated in FIG. 5 as $\Delta C_1$, $\Delta C_2$, and $\Delta C_3$ for sections (a), (b), and c), respectively. The finger interrupts the electric field and thus charge associated with the AC capacitance now has to go somewhere. The finger can be thought of as a ground sink, and the AC charge is "redistributed" to the finger from both the row conductor 2i and the column conductor 3j. The model shown in FIG. 5 assumes ½ of the $\Delta C$ charge is redistributed to each. However, the model could be changed to assume a different ratio of $\Delta C$ charge redistribution to the row conductors 2i and the column conductors 3j. The coefficient in front of the summation term is representative of that ratio. The term $$\frac{1}{2}\sum_{j=0}^{9}\Delta C_j$$

represents the amount of $\Delta C$ charge transfer in the case in which there are multiple touches on touch panel 13A.

In the described example, panel 13A includes 10 rows and 6 columns with a cross-coupling capacitance $C_{SENij}$ node located at each intersection between the 10 row conductors 2i ($0 \leq i \leq 9$) and the 6 column conductors ($0 \leq j \leq 5$), but for convenience, the cross-coupling capacitances $C_{SENij}$ as shown in FIG. 4 and in the subsequently described equations are labeled $C_{Ri}$ ($0 \leq i \leq 9$). Note that $C_{par}$ is a constant, and represents all of the parasitic capacitances associated with the column conductors. It can be represented as a scalar vector of $C_{par}$. The following equations give the values of the output voltages produced on conductor 20 in FIG. 4 by amplifier 31:

$$V_{R0} = \left( \frac{3C_{R0} - 3\Delta C_{R0} - C_{R1} + C_{R2} - \ldots -}{C_{CDAC}} + C_{par} + \frac{1}{2}\sum_{j=0}^{9}\Delta C_{Rj} \right) \frac{V_{DD}}{2}$$

$$V_{R1} = \left( \frac{-C_{R0} + 3C_{R1} - 3\Delta C_{R1} - C_{R2} + C_{R3} \ldots +}{C_{CDAC}} + C_{par} + \frac{1}{2}\sum_{j=0}^{9}\Delta C_{Rj} \right) \frac{V_{DD}}{2}$$

⋮

$$V_{R9} = \left( \frac{-C_{R0} + C_{R1} - C_{R2} + C_{R3} \ldots +}{C_{CDAC}} 3C_{R9} - 3\Delta C_{R9} + C_{par} + \frac{1}{2}\sum_{j=0}^{9}\Delta C_{Rj} \right) \frac{V_{DD}}{2}$$

The voltages $V_{R0,1...9}$ appearing in the above equations appear on the output of amplifier 31 for the case in which the cross-coupling capacitance value presently of interest is $C_{R0}$, and is driven as indicated by section (c) in FIG. 5. The remaining rows corresponding to $C_{R1,2...9}$ are alternately driven as indicated by sections (b) and (a), respectively, in FIG. 5. The driving of all 10 rows results in the summation indicated in FIG. 5 occurring on column conductor 3j, and determines the terms that appear in the numerator of the foregoing equations.

The coefficients of the capacitance change values in the foregoing equations can be represented by the following 10×10 "output matrix", which is represented by "A":

|  |  |  |  |  |  |  |  |  |  |
|---|---|---|---|---|---|---|---|---|---|
| 3 | −1 | 1 | −1 | 1 | −1 | 1 | −1 | 1 | −1 |
| −1 | 3 | −1 | 1 | −1 | 1 | −1 | 1 | −1 | 1 |
| 1 | −1 | 3 | −1 | 1 | −1 | 1 | −1 | 1 | −1 |
| −1 | 1 | −1 | 3 | −1 | 1 | −1 | 1 | −1 | 1 |
| 1 | −1 | 1 | −1 | 3 | −1 | 1 | −1 | 1 | −1 |
| −1 | 1 | −1 | 1 | −1 | 3 | −1 | 1 | −1 | 1 |
| 1 | −1 | 1 | −1 | 1 | −1 | 3 | −1 | 1 | −1 |
| −1 | 1 | −1 | 1 | −1 | 1 | −1 | 3 | −1 | 1 |
| 1 | −1 | 1 | −1 | 1 | −1 | 1 | −1 | 3 | −1 |
| −1 | 1 | −1 | 1 | −1 | 1 | −1 | 1 | −1 | 3 |

Matrix A is same as shown in FIG. 3A. The subsequently described matrix mathematics involves a matrix S which is a 10×10 matrix in which all elements or equal to ½. (However, the quantity ½ is panel-dependent, it could be a 10×10 matrix of all elements equal to ⅓, ⅔, or some other value.) The matrix S is utilized to obtain another matrix J, which is a matrix utilized to obtain the de-convoluted data stream. Also note that if S=0, then Matrix J=−A. Matrix J is equal to −A+S, and is

|  |  |  |  |  |  |  |  |  |  |
|---|---|---|---|---|---|---|---|---|---|
| −2.5 | 1.5 | −0.5 | 1.5 | −0.5 | 1.5 | −0.5 | 1.5 | −0.5 | 1.5 |
| 1.5 | −2.5 | 1.5 | −0.5 | 1.5 | −0.5 | 1.5 | −0.5 | 1.5 | −0.5 |
| −0.5 | 1.5 | −2.5 | 1.5 | −0.5 | 1.5 | −0.5 | 1.5 | −0.5 | 1.5 |
| 1.5 | −0.5 | 1.5 | −2.5 | 1.5 | −0.5 | 1.5 | −0.5 | 1.5 | −0.5 |
| −0.5 | 1.5 | −0.5 | 1.5 | −2.5 | 1.5 | −0.5 | 1.5 | −0.5 | 1.5 |
| 1.5 | −0.5 | 1.5 | −0.5 | 1.5 | −2.5 | 1.5 | −0.5 | 1.5 | −0.5 |
| −0.5 | 1.5 | −0.5 | 1.5 | −0.5 | 1.5 | −2.5 | 1.5 | −0.5 | 1.5 |
| 1.5 | −0.5 | 1.5 | −0.5 | 1.5 | −0.5 | 1.5 | −2.5 | 1.5 | −0.5 |
| −0.5 | 1.5 | −0.5 | 1.5 | −0.5 | 1.5 | −0.5 | 1.5 | −2.5 | 1.5 |
| 1.5 | −0.5 | 1.5 | −0.5 | 1.5 | −0.5 | 1.5 | −0.5 | 1.5 | −2.5 |

The inverse of matrix J is matrix $J^{-1}$, which is equal to −A+S× ½, is referred to as the deconvolution matrix, and is shown as

|  |  |  |  |  |  |  |  |  |  |
|---|---|---|---|---|---|---|---|---|---|
| −9 | 1 | 3 | 1 | 3 | 1 | 3 | 1 | 3 | 1 |
| 1 | −9 | 1 | 3 | 1 | 3 | 1 | 3 | 1 | 3 |
| 3 | 1 | −9 | 1 | 3 | 1 | 3 | 1 | 3 | 1 |
| 1 | 3 | 1 | −9 | 1 | 3 | 1 | 3 | 1 | 3 |
| 3 | 1 | 3 | 1 | −9 | 1 | 3 | 1 | 3 | 1 |
| 1 | 3 | 1 | 3 | 1 | −9 | 1 | 3 | 1 | 3 |
| 3 | 1 | 3 | 1 | 3 | 1 | −9 | 1 | 3 | 1 |
| 1 | 3 | 1 | 3 | 1 | 3 | 1 | −9 | 1 | 3 |
| 3 | 1 | 3 | 1 | 3 | 1 | 3 | 1 | −9 | 1 |
| 1 | 3 | 1 | 3 | 1 | 3 | 1 | 3 | 1 | −9 |

Output matrix A is a square matrix, and is generated partly on the basis of how each row is driven, for example as shown in FIG. 4. Output matrix A represents a full scan of the column of interest, as described above. The top row of the output matrix represents the first foregoing equation, the next row represents the next equation, and so forth.

The 10 capacitances $C_{R0}$, $C_{R1}$ ... $C_{R9}$ in the foregoing equations can be represented by a 10 row by 1 column vector "C", and the 10 output voltages $V_{R0}$, $V_{R1}$ ... $V_{R9}$ can be represented by a 10 row by 1 column vector "V". The vector "C" is multiplied by a constant K, which depends on the analog input vs. digital output transfer function of the ADC. That product is equal to the output voltages $V_{Ri}$ where i is equal to 0, 1 ... 9. The unknown quantities are $C_{R0,1...9}$ of vector C, and the known quantities are $V_{R0}$, $V_{R1}$ ... $V_{R9}$, and the drive information represented by the output matrix. Conventional matrix mathematics can be used to determine the unknown quantities $C_{R0,1...9}$, wherein the inverse of the output matrix A is obtained to provide the inverse matrix $A^{-1}$ which, after being scaled and normalized, has the values indicated below:

|  |  |  |  |  |  |  |  |  |  |
|---|---|---|---|---|---|---|---|---|---|
| 11 | 1 | −1 | 1 | −1 | 1 | −1 | 1 | −1 | 1 |
| 1 | 11 | 1 | −1 | 1 | −1 | 1 | −1 | 1 | −1 |
| −1 | 1 | 11 | 1 | −1 | 1 | −1 | 1 | −1 | 1 |
| 1 | −1 | 1 | 11 | 1 | −1 | 1 | −1 | 1 | −1 |
| −1 | 1 | −1 | 1 | 11 | 1 | −1 | 1 | −1 | 1 |
| 1 | −1 | 1 | −1 | 1 | 11 | 1 | −1 | 1 | −1 |

-continued $$\begin{matrix} -1 & 1 & -1 & 1 & -1 & 1 & 11 & 1 & -1 & 1 \\ 1 & -1 & 1 & -1 & 1 & -1 & 1 & 11 & 1 & -1 \\ -1 & 1 & -1 & 1 & -1 & 1 & -1 & 1 & 11 & 1 \\ 1 & -1 & 1 & -1 & 1 & -1 & 1 & -1 & 1 & 11 \end{matrix}$$

The use of matrix mathematics provides the inverse matrix a $J^{-1}$ for matrix J in order to solve for the unknown cross-coupling capacitance $C_{R0,1...9}$ for the 10 by 6 touch screen panel 13A of the present example. Note, however, that providing a different size panel and/or driving the alternate rows in a different way would result in different superposition of cross-coupling voltages onto the conductor 3j of a column of interest and hence in different output voltage equations, and hence in a somewhat different output matrix and corresponding inverse deconvolution matrix.

In the present example, taking the inverse of matrix J and normalizing and scaling it to obtain the +1 and +3 coefficients results in deconvolution matrix $J^{-1}$ with the "diagonal" elements having magnitudes equal to −9. In the equations, the known, measured $V_{R0,1...9}$ voltages are convoluted voltages that result from capacitive voltage division and associated charge transfers from the cross-coupling capacitances $C_{SENij}$ between the 10 row conductors 2i and the 6 column conductors 3j, one column at a time, and are converted to the signal DATA by SAR ADC 17 and calibrated to provide the signal ΔDATA by subtracting the base line $C_{SENij}$ values in calibration memory 39 by means of summer 40.

The matrix mathematics that can be performed to solve for the values of the 10 unknown capacitances $C_{R0}, C_{R1} \ldots C_{R9}$ when the output voltages $V_{R0}, V_{R1} \ldots V_{R9}$ are measured and therefore known is indicated by:

$$k\left[A \times C_S - A \times \Delta C + C_{par} + \frac{1}{2}\sum_{j=0}^{9} \Delta C_j\right] = D, \quad \text{(Eq. 1)}$$

which is the raw data generated on bus 32 by analog/digital circuitry 15. This equation includes the unknowns ΔC, $\Delta C_{par}$, and $C_S$. Equations 2 and 3 are derived using the inverse matrix $A^{-1}$ and are used to drive Equation 4.

$$k\left[A^{-1}A \times C_S - A^{-1}A \times \Delta C + A^{-1}C_{par} + A^{-1}\frac{1}{2}\sum_{j=0}^{9} \Delta C_j\right] = A^{-1}D \quad \text{(Eq. 2)}$$

$$k\left[C_S - \Delta C + A^{-1}C_{par} + A^{-1}\frac{1}{2}\sum_{j=0}^{9} \Delta C_j\right] = A^{-1}D \quad \text{(Eq. 3)}$$

$$k\left[C_S - \Delta C + A^{-1}C_{par} + A^{-1}\frac{1}{2}\sum_{j=0}^{9} \Delta C_j\right] = A^{-1}D. \quad \text{(Eq. 4)}$$

The summation in Equation 4 is equal to 0 if there is no present touch on panel 13A as indicated below in Equation 5.

$$\frac{1}{2}\sum_{j=0}^{9} \Delta C_j = 0 \quad \text{(Eq. 5)}$$

$$k[A \times C_S + C_{par} + 0] = D_{Cal}. \quad \text{(Eq. 6)}$$

This means the calibrated data matrix is equal to the constant k multiplied by the product of the output matrix A multiplied by the matrix $C_S$, with no contribution to a finger touch. $C_S$ is the matrix or vector including capacitors C1, C2, C3, etc. When a calibration is being performed, the terms $\Delta C_1$, $\Delta C_2$, $\Delta C_3$, etc., are known to be equal to zero. As a result of the method of driving the panel rows in accordance with the present invention, the raw data produced by analog/digital circuitry 15 is equal to the left hand side of Equation 6. That is, the raw data is equal to the constant k multiplied by the product of the output matrix A which represents the method of driving the panel rows, multiplied by the matrix $C_S$ which represents the cross-coupling capacitances of the touch screen panel 13A, plus the matrix Cpar which represents the various parasitic capacitances of the touch screen panel 13A to ground.

Subtracting $D_{Cal}$ from both sides of Equation 1 results in the following Equation 7, $$k\left[A \times C_S - A \times \Delta C + C_{par} + \frac{1}{2}\sum_{j=0}^{9} \Delta C_j\right] - D_{cal} = D - D_{cal}. \quad \text{(Eq. 7)}$$

Substituting Equation 6 into Equation 7 results in eliminating constant $C_{par}$ and matrix $C_S$ so as to obtain $$k\left[-A \times \Delta C + \frac{1}{2}\sum_{j=0}^{9} \Delta C_j\right] = D - D_{Cal}, \quad \text{(Eq. 8)}$$

which represents the signal produced on bus 32A by the output of digital summer 40 in FIG. 3A in the case where there is a finger touch on panel 13A. The data stream at the output of digital summer 40 will just be equal to "0"s. The expression $$\sum_{j=0}^{9} \Delta C_j$$

can be represented by the scalar matrix S=½ for the 10 by 10 matrix A of the present example. (The matrix S value of is very panel-dependent, and could have various other values than ½, depending on how the capacitance of a finger is shunted between the associated row and column conductors of the panel). Since $$A \times \Delta C + S \times \Delta C = (A+S) \times C, \quad \text{(Eq. 9)}$$

it follows that $$k[-A \times \Delta C + S \times \Delta C] = D - D_{Cal}, \quad \text{(Eq. 10)}$$

where the matrix $D - D_{Cal}$ is referred to as "Delta Values". This can be rearranged as $$k[(-A+S) \times \Delta C] = D - D_{Cal}, \quad \text{(Eq. 11)}$$

where (−A+S) is referred to as matrix J. Multiplying both sides of Equation 11 by the inverse matrix $J^{-1}$ results in $$k[J^{-1}J \times \Delta C] = J^{-1}(D - D_{Cal}), \quad \text{(Eq. 12)}$$

which can be rewritten as $$k[\Delta C] = J^{-1}(D - D_{Cal}). \quad \text{(Eq. 13)}$$

This provides the unknown matrix quantity C which represents the output produced on bus 58 by deconvolution circuit 44 in FIG. 3A.

To summarize the deconvolution process, deconvolution block 44 in FIG. 3A performs digital processing of "calibrated" data signal DATA to provide the magnitude map information needed by touch detection circuit 50. The deconvolution process is primarily a matter of adding and subtracting various quantities so as to extract or determine a sum which represents a precise $_{CSENij}$ value for the "capacitor of interest" from the convolution of values previously superimposed onto column conductor 3*j*. (Deconvolution circuit 44 and touch detection circuit 50 preferably are implemented by means of a state machine, which may include three state machines coupled together according to a hierarchy established by a control mechanism. One skilled in the art can readily provide such a state machine for performing the described functions of deconvolution circuit 44, touch detection circuit 50 and digital control logic 38 in FIG. 3A.)

In the following equations, Cjx represents digital raw data produced by SAR ADC 17 after the raw data has been calibrated to generate digital values DATA representing measured analog values of the output of amplifier 31 representing values of $_{CSENIJ}$ for a column of touch screen panel 13A. Cjx represents the desired unknown values of $_{CSENIJ}$ obtained after the deconvolution. The indexes i and j are the row number and column number, respectively, of the cross-coupling capacitances in touch screen panel 13A. Each value of $C_{jx}$ is determined using the following expressions:

$$C_{j0} = (-9*V_{j0}) + (1*V_{j1}) + (+3*V_{j2}) + (1*V_{j3}) + (+3*V_{j4}) + (1*V_{j5}) + (+3*V_{j6}) + (1*V_{j7}) + (+3*V_{j8}) + (1*V_{j9})$$

$$C_{j1} = 1*V_{j0} + (-9*V_{j1}) + (1*V_{j2}) + (+3*V_{j3}) + (1*V_{j4}) + (+3*V_{j5}) + (1*V_{j6}) + (+3*V_{j7}) + (1*V_{j8}) + (+3*V_{j9})$$

$$C_{j2} = +3*V_{j0} + (1*V_{j1}) + (-9*V_{j2}) + (1*V_{j3}) + (+3*V_{j4}) + (1*V_{j5}) + (+3*V_{j6}) + (1*V_{j7}) + (+3*V_{j8}) + (1*V_{j9}).$$

One skilled in the art would understand that the $C_{jx}$ terms in the foregoing equations can represent either the analog voltages produced during the analog measurement phase of operation or the quantized representations thereof (depending on the value of the voltage-to-LSB conversion factor "k" used for previous Equations 1-13) after the corresponding analog voltages across the CDAC 23 are digitized during the SAR procedure of quantizing the corresponding analog voltages across the CDAC into the 12-bit digital word DATA.

From this, it can be seen that the top row of the inverse matrix $J^{-1}$ is used to find the value for $C_{jx}$ which represents the node of the j-th column and row 0 of the touch screen panel 13A. The last or bottom row of the inverse matrix $J^{-1}$ is used to find the value of the 9th or top row in the column of the panel 13A. All of the convoluted $_{CSENIJ}$ values for every row in the column are used to determine the single deconvoluted value $C_{R0,1\ldots 9}$ (FIG. 4) of each row within a column.

Thus, the deconvolution function in essence involves solving a plurality of equations that represent the cross-coupling capacitances $C_{R0,1\ldots 9}$ (FIG. 4) as functions of the amounts and polarities of charge transferred to the first column conductor 3*j* and the corresponding voltage components $C_{R0,1\ldots 9}$ (FIG. 4) produced on the first column conductor.

Figure 6A:
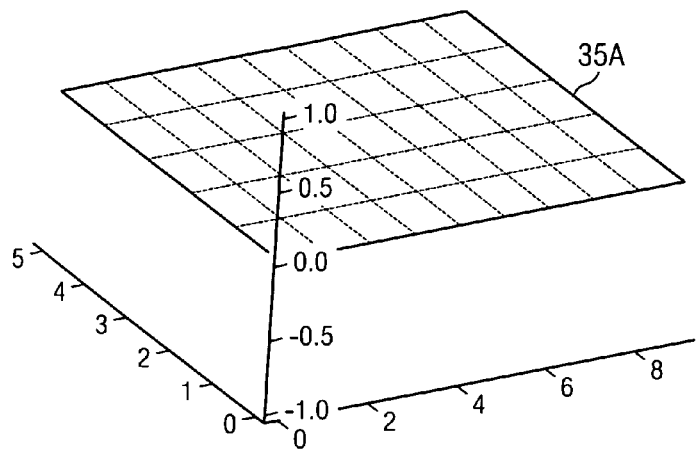
FIG. 6A is a 3-dimensional diagram illustrating raw data from digital summer 40 with no touch on the touch panel.
Figure 6B:
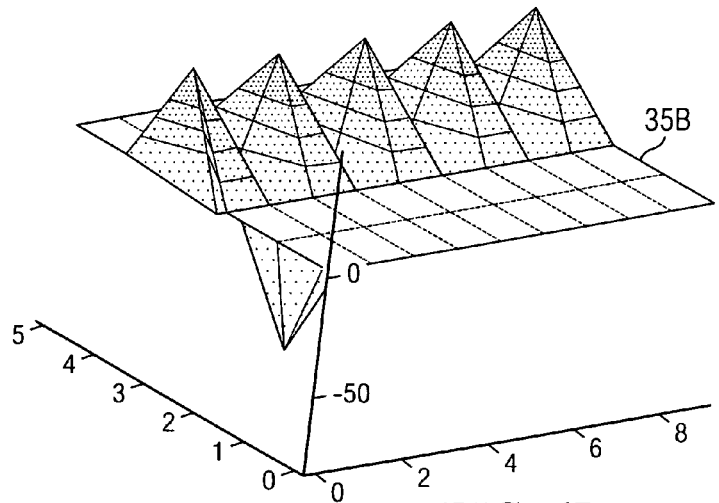
FIG. 6B is a 3-dimensional diagram illustrating raw data resulting from digital summer 40 in response to a single touch.
Figure 6C:
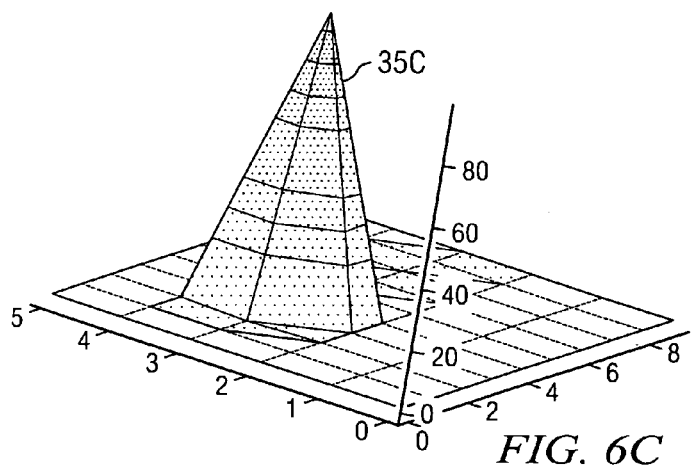
FIG. 6C is a 3-dimensional diagram illustrating the panel map after deconvolution in response to a single touch.

At this point, before further describing the deconvolution process with reference to FIG. 7, it may be helpful to refer to the 3-dimensional diagrams of FIGS. 6A, 6B, and 6C. FIG. 6A shows a 3-dimensional representation of the convoluted raw data 35A for panel 13A (after calibration) as it is produced on bus 32A in FIG. 3A in the case in which there is no touch on panel 13A.

FIG. 6B shows a 3-dimensional representation of the convoluted raw data 35B for panel 13A (after calibration) as it is produced on bus 32A in FIG. 3A in the case in which there is presently a single finger touch on panel 13A.

FIG. 6C shows the final map of all the deconvoluted data 35C for panel 13A for the case in which there is a single touch thereon.

The flowchart of FIG. 7 indicates the deconvolution process performed in deconvolution circuit 44 of FIG. 3A and column data deconvolution circuit 44A of FIG. 3B. A full column (including 10 cross-coupling capacitances or nodes $C_R$; ($0 \leq i \leq 9$) (FIGS. 4 and 5) for a 10 row by 6 column panel) of digitized and calibrated data DATA representing values of $_{CSENIJ}$ for that column, by "scanning" that column, is required before the deconvolution process of FIG. 7 can begin at "start" label 120.

In block 121, the deconvolution algorithm performs an initialization process which includes resetting a number of variables. A counter which counts from 0 to 9 to indicate the number of rows processed is reset to 0. (For each node of interest, all 10 rows must be processed.) The matrix A is always a square matrix. A variable ROW MAX is set to 9 to indicate the total number of rows, based on the configuration of panel 13A. A temporary register TEMP which stores temporary data is reset to 0.

In block 123, the node of interest is scaled. That is, the value of $V_{ij}$ for the node of interest is multiplied by the quantity −9 (which can be a programmable element referred to as "variable A" or VARA) in the diagonal of inverse matrix $J^{-1}$. The node of interest is always the first node processed. In block 123, the deconvolution algorithm performs the multiplication operations that involve the diagonal of inverse matrix $J^{-1}$, beginning with the diagonal elements of the node of interest, continuing to the right edge of the inverse matrix, "wrapping around" to the left end of that row and continuing up to the diagonal element. If the node of interest is row 0, then this value of −9 appears in the upper left corner of inverse matrix $J^{-1}$. This may be accomplished by shifting the binary value of $_{CSENIJ}$ by three bits to accomplish multiplication by 8, and then an un-shifted binary value of $_{CSENIJ}$ can be added to The temporary register TEMP to thereby achieve a total multiplication by the quantity 9. (In order to achieve the multiplication by −9, the binary bits representing the number 8 in TEMP can be inverted and then a 1 can be added.)

Next, in block 125, the other node values of $V_{ij}$ corresponding to the +1 elements and +3 elements, as indicated in the appropriate column of inverse matrix $J^{-1}$, starting with the element immediately to the right of the "−9" element therein, are algebraically added to the present node value of $V_{ij}$. By having an even number of rows in inverse matrix $J^{-1}$, the matrix can have just three different elements, namely the diagonal element −9 (programmable Variable A), the element +1 (programmable Variable B) immediately to the right of the diagonal element, and the element +3 (programmable Variable C) two spaces to the right of the diagonal element In block 126, the algorithm shifts one row to the right in inverse matrix $J^{-1}$, starting with the element immediately to the right of the diagonal element and increments the row counter to keep track of how many rows have been processed. For example, if the node of interest is in the 8th row, then after the node is multiplied by −9, the next row will be added in accordance with the "+1" in the last column of the 9th row in the inverse matrix $J^{-1}$. At this point, only 2 row values of $V_{ij}$ would have been processed, so the algorithm allows the addition to loop back to the first column of the same row, row 9 in the inverse matrix $J^{-1}$. The row counter mentioned above determines whether or not all rows of panel 13A have been processed.

Then, in decision block 127 the algorithm determines if all 10 columns of the current row of inverse matrix $J^{-1}$ have been processed. If that is not the case, then the deconvolution program goes to decision block 128 and determines whether the polarity of the next element in inverse matrix $J^{-1}$ has an odd polarity or an even polarity, based on the row counter, i.e., with respect to the diagonal. Odd polarity elements are multiplied by +1 (Variable B) as shown in block 129 and even polarity elements are multiplied by +3 (Variable C) as shown in block 130. Thus, depending on the determination of decision block 128, the value of the present node of the present row (of the column being deconvoluted) is multiplied by the appropriate scale value and is then added to or subtracted from the $V_{ij}$ sum being accumulated to produce the value of the first cross-coupling capacitance change ($C_{R0}$ in this example) of interest.

The deconvolution algorithm then loops back to block 125 and repeats the foregoing sequence of steps until an affirmative determination is made in decision block 127 indicating that all of the columns of the current row of inverse matrix $J^{-1}$ have been processed.

The algorithm then goes to block 132 and computes a scaled down, more convenient representation of the cumulative value of the first cross-coupling capacitance of interest, for example by dividing it by 8 (Variable D or YARD), which can be accomplished by simple binary shifting. (Thus, the deconvolution algorithm primarily involves adding or subtracting appropriate scaled values corresponding to the −9's and the alternate +1's and +3's in inverse matrix $J^{-1}$.)

The procedure would be essentially similar for a different touch screen panel, and the algorithm would go through block 123 and perform a different multiplication in accordance with a different inverse matrix which corresponds to a different panel, in which case the ROW MAX quantity associated with the initialization process of block 121 might be different.

The foregoing procedure then is repeated for each of the 5 remaining columns, to thereby obtain the complete magnitude map of touch screen panel 13A.

Figure 8:
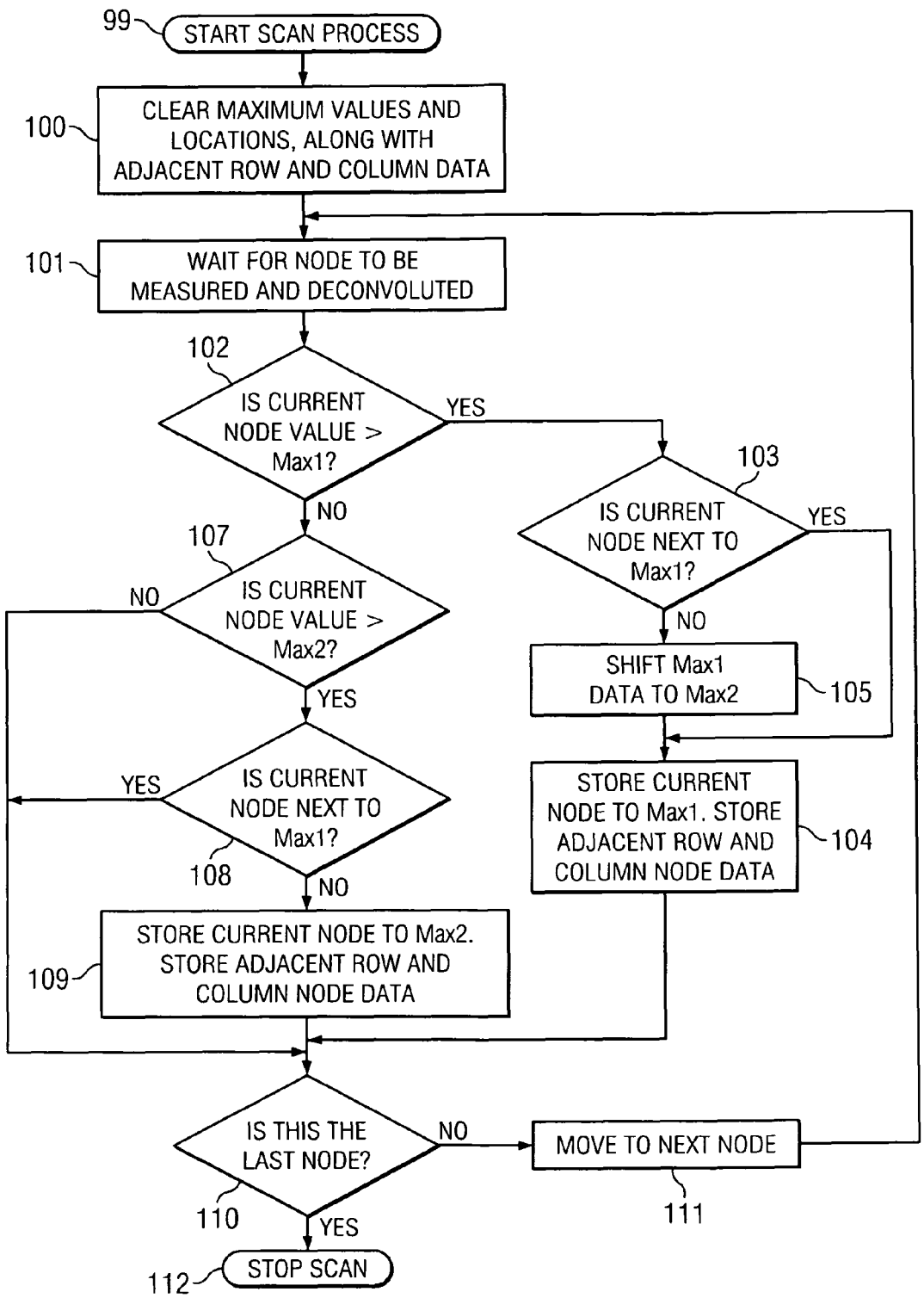
FIG. 8 is a flowchart that illustrates a touch detection process in block 50 of the touch screen controller of FIG. 3D.

The flowchart of FIG. 8 illustrates the basic operation of touch detection operation by block 50 of FIG. 3A and block 50A of FIG. 3D to determine the location on touch screen panel 13A of a cross-coupling capacitance change $C_{SENIJ}$ that has been touched and measured as described above. The maximum values of $C_{SENIJ}$ are determined from Nodes 0-59 (see FIG. 3F) of the computed magnitude map of panel 13A.

In Start Scan Process label 99 the algorithm initiates operation of analog/digital circuit 15. As previously explained, the execution of the deconvolution algorithm of FIG. 7 automatically begins as soon as convoluted data for one column 3$j$ of touch screen panel 13A is available in memory 43. In block 100, various maximum $C_{SENIJ}$ values and node location values are cleared.

In block 101, the touch detection algorithm waits for digital data from a scan of the entire first column of corresponding capacitance changes $C_{SENIJ}$ (i.e., $C_{R0,1\ldots 9}$ in FIG. 4) of touch screen panel 13A panel to be measured by analog/digital circuit 15 and deconvoluted by deconvolution circuit 44. As soon as block 101 determines that valid deconvoluted data for column 0 in touch screen panel 13A is available, the algorithm goes to decision block 102.

Regarding decision block 102, the term "node value" refers to a capacitance change value $\Delta C_{SENIJ}$. The term "current node" refers to the current cross-coupling capacitance change $C_{SENij}$ on which the touch location algorithm is currently operating. The "current node value" is the value of $\Delta C_{SENIJ}$ for the "current node", and is obtained from memory 47. Max 1 is a variable which is updated with (1) the maximum $C_{SENIJ}$ value that has been found so far in the present operation of the touch location algorithm, and (2) the Node number which corresponds to the location (i.e., row number and column number) of that maximum $C_{SENIJ}$ value on touch screen panel 13A. When the algorithm saves a new maximum $C_{SENIJ}$ value to a Max 1 location in memory 50B of FIG. 3D, the algorithm actually saves both that $C_{SENIJ}$ value and the corresponding present Node location number at the same time. The touch location algorithm provides the two variables Max 1 and Max 2 in order to allow two simultaneous valid finger touches to be detected and located. The touch detection algorithm also ensures that the $C_{SENIJ}$ value Max 1 is always greater than the $C_{SENIJ}$ value of Max 2.

It should be understood that even if a finger touches panel 13A directly over a node, there is an electric field gradient effect that will cause a bit of corresponding cross-coupling capacitance change to occur on the closely adjacent nodes. If there actually is only a single finger touch on panel 13A, that gradient effect could be misinterpreted as a second touch. Therefore, the touch detection algorithm prevents an actual touch from being registered as a valid touch if the actual touch is located immediately adjacent to the present maximum touch location. Instead, the touch detection algorithm requires the present touch to be located at least one node away from the present maximum touch location in order to be recognized as a separate valid touch.

Accordingly, the touch location algorithm provides an "adjacent row node" location to the left or right of the present node, and stores $C_{SENIJ}$ values for this adjacent row node. (The "adjacent row nodes" actually are variables which are given the $C_{SENIJ}$ values corresponding to the "adjacent row node".) The algorithm determines which of two adjacent row nodes have a higher $C_{SENIJ}$ and stores that information for this node. Similarly, the touch location algorithm provides an "adjacent column node" location above or below the present node, and stores $C_{SENIJ}$ values for this adjacent column node. (The "adjacent column nodes" actually are variables which are given the $C_{SENIJ}$ values corresponding to the "adjacent column node".) The algorithm determines which of two adjacent column nodes have a higher $C_{SENIJ}$ and stores that information for this node.

Returning to decision block 102, the algorithm determines if the current node value is greater than the present value of Max 1. That means the touch location algorithm determines whether the $C_{SENIJ}$ of the present node is greater than the maximum $C_{SENIJ}$ value presently stored in the Max1 location of memory 50B.

If the determination of decision block 102 is affirmative, the touch detection algorithm goes to decision block 103. In block 103, the touch detection algorithm determines if the $C_{SENIJ}$ of the present node is adjacent to the node in which the previous maximum value of $C_{SENIJ}$ is stored. If the determination of decision block 103 is affirmative, the touch detection algorithm goes to block 104 and stores both the current $C_{SENIJ}$ node data and current node location data and the "adjacent row node" $C_{SENIJ}$ data and "adjacent column node" $C_{SENIJ}$ data in the Max 1 location of memory 50B.

If the decision of block 103 is negative, that is, the present touch is not immediately adjacent to the Max 1 location, then the algorithm determines that the $C_{SENIJ}$ of the present node is a second valid maximum $C_{SENIJ}$ value corresponding to a second valid present touch, and the algorithm transfers the current $C_{SENIJ}$ value and node location of Max 1 into the Max 2 location of memory 50B, as indicated in block 105. The algorithm then stores both the current $C_{SENIJ}$ Node value and current node location, and also the adjacent row $C_{SENIJ}$ and adjacent column $C_{SENIJ}$ values in the Max 1 location of memory 50B and goes to decision block 110.

If the determination of decision block 102 is negative, then the algorithm goes to decision block 107 and determines whether the $C_{SENIJ}$ of the present node is greater than the present maximum $C_{SENIJ}$ value stored in the Max2 location of memory 50B. If this determination is negative, the algorithm goes to decision block 110. Otherwise the algorithm goes to decision block 108 and determines if the current node is adjacent to the node location previously stored in the Max 1 location of memory 50B. If the determination of decision block 108 is affirmative, the algorithm goes to decision block 110. If the determination of decision block 108 is negative, that means the present node is located at least one node away from the present Max 1 location (i.e., the present $C_{SENIJ}$ represents a separate valid touch which is distinct from the present "maximum strength" touch over the present node). The algorithm therefore goes to block 109 and stores the present $C_{SENIJ}$ value and node location in the Max 2 location of memory 50B, and also stores the corresponding "adjacent row node" and "adjacent column node" $C_{SENIJ}$ data in the Max 2 location.

In decision block 110, the algorithm determines whether the present node is the last node. That is, the algorithm determines whether the present node is Node 59 of touch screen panel 13A. If the determination of decision block 110 is negative, then present node is not the last node, and the algorithm goes to block 111 and increments a node counter and then returns to block 101 and repeats the foregoing process for the next node. (Note that the algorithm progresses from bottom left to top left i.e., from Node 0 to Node 9 of column 0 in touch screen panel 13A and then to Node 10 and up to Node 19 of adjacent column 1. Thus, as the algorithm progresses it only acquires $_{CSENIJ}$ data for nodes located below or to the left of the current node. When the algorithm stores a new maximum $C_{SENIJ}$ value in an "adjacent row and column", that refers to the column immediately to the left of the present node and the row immediately below the present node. As an example, if Node 13 were determined to be the new Max 1, then Node 3 would be stored as an adjacent column and Node 12 would be stored as an adjacent row. If the current node is above a Max value or to the right of a Max value, then the corresponding row and column, respectively, will be prepared. If the current node is greater, then it will replace the current row or column data.

If the determination of decision block 110 is affirmative, then the present node is the last node, and the algorithm goes to Stop Scan label 112. That means the algorithm has 12 pieces of data available for the user. The 12 pieces of data include a first set of 6 items, including a maximum $_{CSENIJ}$ value on the panel and a corresponding node location, the adjacent row node $_{CSENIJ}$ magnitude and row location immediately to the right or left of the present node, and the adjacent column node $C_{SENIJ}$ magnitude and column location immediately above or below the present node. The algorithm also provides a corresponding additional six pieces of data for the second largest touch magnitude or $C_{SENIJ}$ on the panel.

The touch detection algorithm goes to label 112, stops the scan, and typically transmits an IRQ (interrupt routine request) to the user.

The above described invention reduces the digital processing requirement relative to the processing requirement of the above mentioned prior art touch screen panel products by an order of magnitude, and therefore can provide a much smaller more economical touch screen controller.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A capacitance measuring system comprising:
   (a) analog-digital circuitry coupled to row conductors and column conductors of a touch screen panel for producing a first digital signal representative of cross-coupling capacitances of the touch screen panel, the analog-digital circuitry including row drive circuitry which superimposes charge transfers from cross-coupling capacitances of at least a plurality of the row conductors to a first column conductor to cause the first digital signal to be a convoluted signal which is a function of the cross-coupling capacitances of at least the plurality of row conductors;
   (b) calibration circuitry coupled to receive the first digital signal for subtracting base line data representing neutral values of the cross-coupling capacitances and subtracting the base line data from the first digital signal to produce a second digital signal which represents digital touch-induced capacitance change values caused by the presence of a touch near a cross-coupling capacitance of the touch screen panel; and
   (c) a deconvolution circuit for deconvoluting the second digital signal to produce a third digital signal which represents a magnitude map of the touch-induced capacitance change values.

2. The capacitance measuring system of claim 1 wherein the row drive circuitry includes circuitry for precharging and sampling a cross-coupling capacitance of interest so as to transfer a first amount of charge to the first column conductor, precharging and sampling each of a first group of approximately half of the cross-coupling capacitances other than the cross-coupling capacitance of interest so as to transfer a second amount of charge from each cross-coupling capacitance of the first group to the first column conductor, and precharging and sampling each of a second group of approximately another half of the cross-coupling capacitances other than the cross-coupling capacitance of interest so as to transfer a third amount of charge from each cross-coupling capacitance of the second group to the first column conductor to superimpose a convoluted signal on the first column conductor.

3. The capacitance measuring system of claim 2 wherein the precharging and sampling occurs prior to converting of a resulting convoluted signal on the first column conductor to the first digital signal.

4. The capacitance measuring system of claim 2 wherein the second amount of charge and the third amount of charge are of opposite polarities so as to result in canceling of a net amount of charge transferred from the first and second groups to the first column conductor, and wherein the first amount of charge has a magnitude substantially greater than a magnitude of the second amount of charge and a magnitude of the third amount of charge.

5. The capacitance measuring system of claim 1 wherein the deconvolution circuit operates on the second digital signal by in essence solving a plurality of equations that represent the cross-coupling capacitances as functions of the amounts and polarities of charge transferred to the first column conductor and corresponding voltage components produced on the first column conductor in order to produce the third digital signal.

6. The capacitance measuring system of claim 5 wherein the deconvolution circuit stores an inverse matrix representing coefficients of the plurality of equations that represent the cross-coupling capacitances as functions of the amounts and polarities of charge transferred to the first column conductor and the corresponding voltage components produced on the first column conductor, and multiplies the inverse matrix by a vector matrix representing values of the second digital data signal obtained for each of the cross-coupling capacitances to obtain the values of the third digital signal representing the magnitude map of the touch capacitance change values.

7. The capacitance measuring system of claim 1 including a touch detection circuit, coupled to receive the third digital signal, for repeatedly detecting and storing updated values of a first maximum magnitude capacitance variable and associated row and column locations and values to determine the location of a maximum magnitude cross-coupling capacitance change caused by a present first touch on the touch screen panel.

8. The capacitance measuring system of claim 1 wherein the row drive circuitry superimposes the charge transfers to the first column conductor essentially simultaneously.

9. The capacitance measuring system of claim 1 wherein the row drive circuitry superimposes charge transfers from cross-coupling capacitances of at least the plurality of the row conductors to a second column conductor to cause a corresponding portion of the first digital signal to be a convoluted signal which is a function of the cross-coupling capacitances of at least the plurality of row conductors.

10. The capacitance measuring system of claim 7 wherein the touch detection circuit also detects and stores updated values of a second maximum magnitude capacitance variable and associated row and column locations to determine the location of a maximum magnitude cross-coupling capacitance change caused by a present second touch on the touch screen panel located at least a minimum distance from the first touch.

11. The capacitance measuring system of claim 1 wherein the calibration circuitry includes a calibration memory for storing the base line data and a digital summer for subtracting the base line data from the first digital signal.

12. The capacitance measuring system of claim 7 wherein the deconvolution circuit includes a memory for storing values of the second digital data signal obtained for each of the cross-coupling capacitances coupled to the first column conductor and wherein the touch detection circuit includes a memory for storing updated values of the first maximum magnitude capacitance variable and associated row and column locations.

13. The capacitance measuring system of claim 1 wherein the analog-digital circuitry includes
  (a) a successive approximation register analog-to-digital conversion circuit (SAR ADC) including
    1. a comparator,
    2. a divider/feedback CDAC (capacitor digital-to-converter) including a plurality of weighted CDAC capacitors each having a first terminal coupled to a corresponding one of a plurality of conductors, respectively, and each having a second terminal coupled by a first conductor to a first input of the comparator,
    3. SAR logic and switch circuitry which produces a digital output on a digital bus, an output of the comparator being coupled to an input of the SAR logic and switch circuitry, the SAR logic and switch circuitry being coupled to control the plurality of conductors during a SAR conversion, and
    4. a first switch having a first terminal coupled the first input of the comparator; and
  (b) an active network for coupling a capacitor to be measured to the SAR ADC, the active network including
    1. a measurement conductor coupled to a first terminal of the capacitor to be measured,
    2. an amplifier for performing the function of aiding charge redistribution among the capacitance to be measured and the CDAC capacitors during a measurement phase, the amplifier having a first input coupled to a second terminal of the first switch, a second input coupled to a first reference voltage and an output coupled to an amplifier output conductor, and
    3. a first switching circuit for coupling the amplifier output conductor to the plurality of conductors during the measurement phase.

14. The capacitance measuring system of claim 1 wherein the touch screen panel includes 10 rows and 6 columns.

15. A method for measuring a capacitance, comprising:
  (a) operating row drive circuitry of analog-digital circuitry coupled to row conductors and column conductors of a touch screen panel for producing a first digital signal representative of cross-coupling capacitances of the touch screen panel so as to superimpose charge transfers from cross-coupling capacitances of at least a plurality of the row conductors to a first column conductor thereby causing the first digital signal to be a convoluted signal which is a function of the cross-coupling capacitances of at least the plurality of row conductors;
  (b) producing a second digital signal which represents digital touch-induced capacitance change values caused by the presence of a touch near a cross-coupling capacitance of the touch screen panel by subtracting base line data representing the cross-coupling capacitances from the first digital signal; and
  (c) deconvoluting the second digital signal to produce a third digital signal which represents a magnitude map of the touch-induced capacitance change values.

16. The method of claim 15 including precharging and sampling a cross-coupling capacitance of interest so as to transfer a first amount of charge to the first column conductor, precharging and sampling each of a first group of approximately half of the cross-coupling capacitances other than the cross-coupling capacitance of interest so as to transfer a second amount of charge from each cross-coupling capacitance of the first group to the first column conductor, and precharging and sampling each of a second group of approximately another half of the cross-coupling capacitances other than the cross-coupling capacitance of interest so as to transfer a third amount of charge from each cross-coupling capacitance of the second group to the first column conductor to thereby superimpose a convoluted signal on the first column conductor.

17. The method of claim 16 wherein the precharging and sampling occurs prior to converting of a resulting convoluted signal on the first column conductor to the first digital signal, and wherein the second amount of charge and the third amount of charge are of opposite polarities so as to result in canceling of a net amount of charge transferred from the first and second groups to the first column conductor, and wherein the first amount of charge has a magnitude substantially greater than a magnitude of the second amount of charge and substantially greater than a magnitude of the third amount of charge.

18. The method of claim 15 wherein the deconvoluting operates on the second digital signal by in essence solving a plurality of equations that represent the cross-coupling capacitances as functions of the amounts and polarities of charge transferred to the first column conductor and corresponding voltage components produced on the first column conductor in order to produce the third digital signal.

19. The method of claim 15 including, after step (b), repeatedly detecting and storing updated values of a first maximum magnitude capacitance variable and associated row and column locations to determine the location of a maximum magnitude cross-coupling capacitance change caused by a present first touch on the touch screen panel.

20. A system for measuring a capacitance, comprising:
(a) means coupled to row conductors and column conductors of a touch screen panel for producing a first digital signal representative of cross-coupling capacitances of the touch screen panel so as to superimpose charge transfers from cross-coupling capacitances of at least a plurality of the row conductors to a first column conductor thereby causing the first digital signal to be a convoluted signal which is a function of the cross-coupling capacitances of at least the plurality of row conductors;
(b) means for producing a second digital signal which represents digital touch-induced capacitance change values caused by the presence of a touch near a cross-coupling capacitance of the touch screen panel by subtracting base line data representing the cross-coupling capacitance changes from the first digital signal; and
(c) means for deconvoluting the second digital signal to produce a third digital signal which represents a magnitude map of the touch-induced capacitance change values.

* * * * *